US009849378B2

(12) United States Patent
Poisner et al.

(10) Patent No.: US 9,849,378 B2
(45) Date of Patent: Dec. 26, 2017

(54) METHODS, APPARATUSES, AND SYSTEMS FOR REMOTE PLAY

(71) Applicant: Intel Corporation, Santa Clara, CA (US)

(72) Inventors: David I. Poisner, Carmichael, CA (US); Glen J. Anderson, Beaverton, OR (US); Yevgeniy Yarmosh, Portland, OR (US); Mark R. Francis, Portland, OR (US); Ian J. Mcclellan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 111 days.

(21) Appl. No.: 14/748,574

(22) Filed: Jun. 24, 2015

(65) Prior Publication Data
US 2016/0375360 A1 Dec. 29, 2016

(51) Int. Cl.
*A63F 13/25* (2014.01)
*A63F 13/00* (2014.01)
*G06F 3/01* (2006.01)
*A63F 13/213* (2014.01)

(52) U.S. Cl.
CPC ............ *A63F 13/25* (2014.09); *A63F 13/00* (2013.01); *A63F 13/213* (2014.09); *G06F 3/017* (2013.01)

(58) Field of Classification Search
CPC ......... G06F 3/017; G06T 19/006; A63F 13/25
See application file for complete search history.

(56) References Cited

U.S. PATENT DOCUMENTS

| 8,913,085 | B2* | 12/2014 | Anderson | H04N 5/2621 345/629 |
| 2006/0205502 | A1* | 9/2006 | Kaneshige | A63F 13/426 463/33 |
| 2008/0125860 | A1* | 5/2008 | Webler | A61B 17/00234 623/2.36 |
| 2011/0053688 | A1* | 3/2011 | Crawford | A63D 5/04 463/31 |
| 2011/0079959 | A1* | 4/2011 | Hartley | G07F 17/32 273/292 |
| 2012/0320158 | A1* | 12/2012 | Junuzovic | G06F 3/017 348/46 |

(Continued)

OTHER PUBLICATIONS

"Intel® RealSense™ Technology", Jun. 24, 2015, 10 pages; http://www.intel.com/content/www/us/en/architecture-and-technology/realsense-overview.html.

*Primary Examiner* — Kee M Tung
*Assistant Examiner* — Grace Q Li
(74) *Attorney, Agent, or Firm* — Schwabe, Williamson & Wyatt, P.C.

(57) ABSTRACT

Methods, apparatuses, systems, and storage media for emulating physical gaming experiences are provided. In embodiments, a computing device or a remote play module may detect a first object in a field of view (FOV), obtain object data representative of a second object detected by another apparatus and a position of the second object, determine a position of the first object using the sensor data, generate an image of the second object based on the object data, generate an overlay image based on the first object or the second object, display the generated image at a position within the FOV based on the position of the second object, and display the overlay image within the FOV. Other embodiments may be described and/or claimed.

25 Claims, 17 Drawing Sheets

(56) References Cited

U.S. PATENT DOCUMENTS

| | | | |
|---|---|---|---|
| 2013/0110565 A1* | 5/2013 | Means, Jr. | G06Q 10/063 |
| | | | 705/7.11 |
| 2014/0262933 A1* | 9/2014 | Lockwood | A45C 11/00 |
| | | | 206/762 |
| 2015/0133193 A1* | 5/2015 | Stotler | G06F 1/163 |
| | | | 455/557 |
| 2016/0021153 A1* | 1/2016 | Hull | H04L 65/403 |
| | | | 715/753 |

* cited by examiner

METHODS, APPARATUSES, AND SYSTEMS FOR REMOTE PLAY

FIELD

The present disclosure relates to the field of interactive computing, and in particular, to apparatuses, methods, storage media, and systems for emulating physical gaming environments.

BACKGROUND

With advances in computing, many applications provide interactive experience. For example, entertainment systems, video game consoles, and/or other like gaming devices typically provide interactive gaming experiences wherein users interact with a game and/or other users by providing one or more inputs and receiving feedback in response to the provided inputs. The inputs may be provided using an input device or controller, such as joysticks, keyboards, computer mice, touchscreens, motion sensing devices, and the like. The feedback may be received using one or more output devices, such as through display devices, audio devices, haptic feedback devices, and the like.

Gaming devices and their controllers may provide some interactive gaming experiences. However, many of these gaming devices are unable to emulate games that require in-real-life (IRL) interaction between participants and/or between physical objects. For example, many card-based games, such as collectable card games (CCGs), trading card games (TCGs), and/or other like playing card games, typically require that players be in each other's presence in order to properly play the playing card games. Many gaming systems have been developed, which attempt to emulate these playing card games in virtual gaming environments. Most of these virtual gaming environments involve playing a card game simulation over the internet or within a Local Area Network (LAN), wherein instead of receiving physical playing cards, each player establishes a virtual card collection that exists only as a set of data stored on a remote server. Some of these virtual gaming environments include game boards, animations, and sound effects for some virtual cards, when the virtual cards are used during the simulated playing card game. However, some of the nuance of IRL game play is lost while playing virtual playing card game. In addition, physical card collections, which are an important source of revenue for the playing card industry, cannot be used during the simulated playing card game. Therefore, it may be desirable to provide IRL CCG play and/or other like IRL card-based game play when game participants are not within each other's physical presence.

In addition to the previously mentioned card-based game play, most analog toys or other like physical objects require IRL interaction between game play participants. Further, many parents wish for their children to play with analog toys with other children, and would like their children to not play screen-based games via video game consoles and/or personal computing devices. However, it can be difficult for children to play together with their analog toys when they live significant distances from each other, and some nuance may be lost when children attempt to emulate the IRL interactions with their analog toys using traditional internet-based or cellular communications methods. Therefore, it may be desirable to emulate IRL game play between participants using analog toys and/or other like physical objects.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
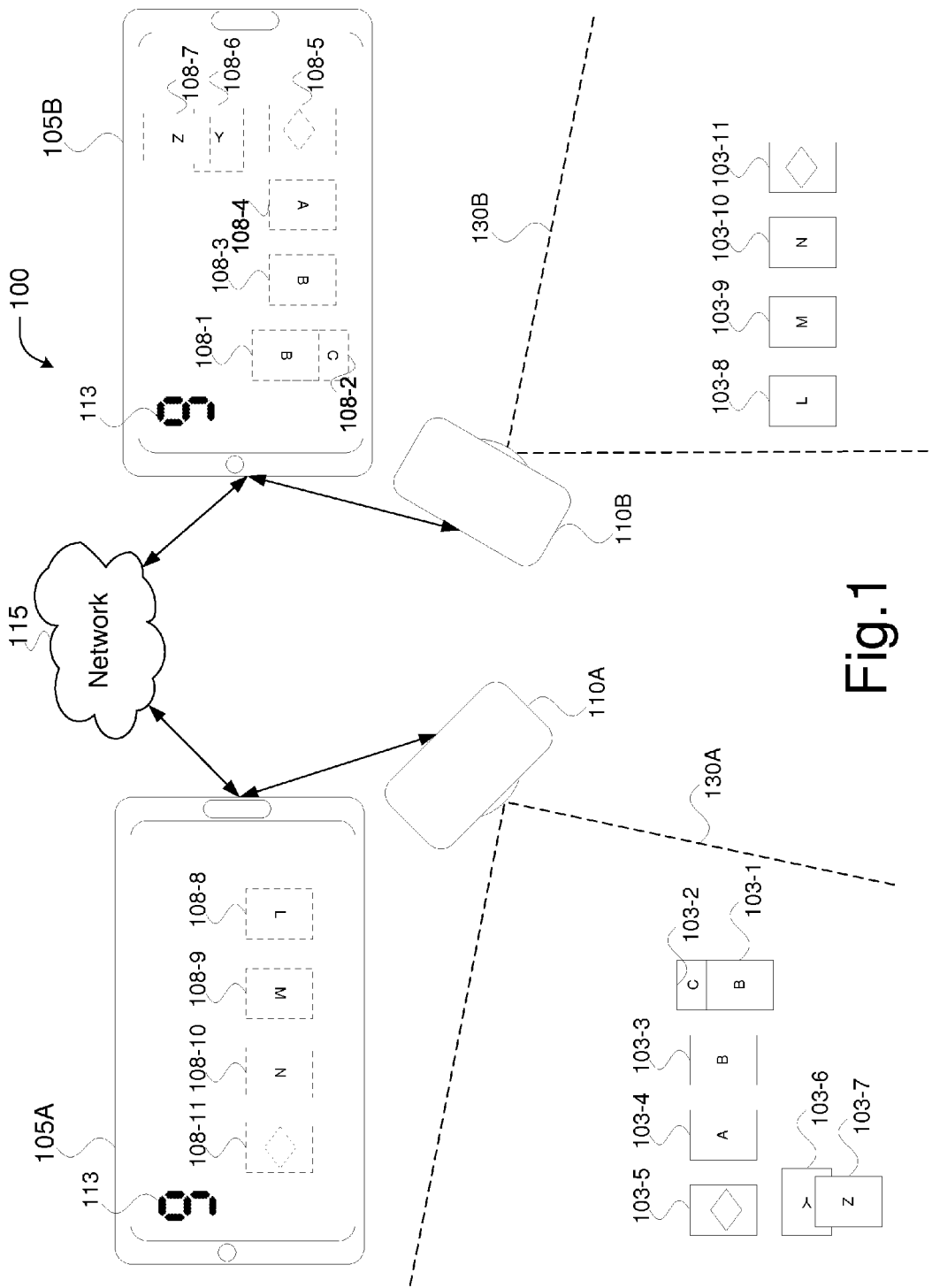
FIGS. 1-10 illustrate various remote play environments in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural and/or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions and/or operations in turn, in a manner that is most helpful in understanding the claimed subject matter. However, the order of description should not be construed to imply that the various operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For the purposes of the present disclosure, the phrase "at least one of A and B" means (A), (B), or (A and B).

The description may use the phrases "in an embodiment", or "in embodiments", which may each refer to one or more of the same or different embodiments. Furthermore, the terms "comprising," "including," "having," and the like, as used with respect to embodiments of the present disclosure, are synonymous.

When an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

As used herein, the term "logic", "module", and/or "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. In some embodiments, the modules and/or circuitry may be implemented in, or functions associated with the modules and/or circuitry may be implemented by, one or more software or firmware modules in combination with one or more hardware devices.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "computing device" may be considered synonymous to, and may hereafter be occasionally referred to, as a client, client device, personal computer (PC), mobile, mobile unit, mobile device, mobile terminal, mobile station, mobile user, user equipment (UE), user terminal, subscriber, user, remote station, access agent, user agent, receiver, etc., and may describe a remote user of network resources in a communications network. Furthermore, the term "computing device" may include any type of wired and/or wireless device such as consumer electronics devices, desktop PCs, laptop PCs, smartphones or other like cellular phones, tablet PCs, wearable computing devices, personal digital assistants (PDAs), and/or any other like physical computing device that is able to connect to a communications network.

As used herein, the term "network element", may be considered synonymous to and/or referred to as a networked computer, networking hardware, network equipment, router, switch, hub, bridge, gateway, and/or other like device. The term "network element" may describe a physical computing device of a wired or wireless communication network that is configured to host a client device and the like. Furthermore, the term "network element" may describe equipment that provides radio baseband functions for data and/or voice connectivity between a network and one or more users.

As used herein, the term "play" may considered synonymous to and/or referred to as a game, card game, quest, sport, event, activity, role-playing games (RPG), simulation, etc. The term "play" and/or "game" as used herein may be any sequence of events with or without a defined set of rules, wherein the sequence of events and/or rules may be defined by one or more participants, a game operator, and/or any other like entity. Typically games have a beginning and a conclusion, but in some embodiments, a game may not have either a beginning or an ending.

Figure 2:
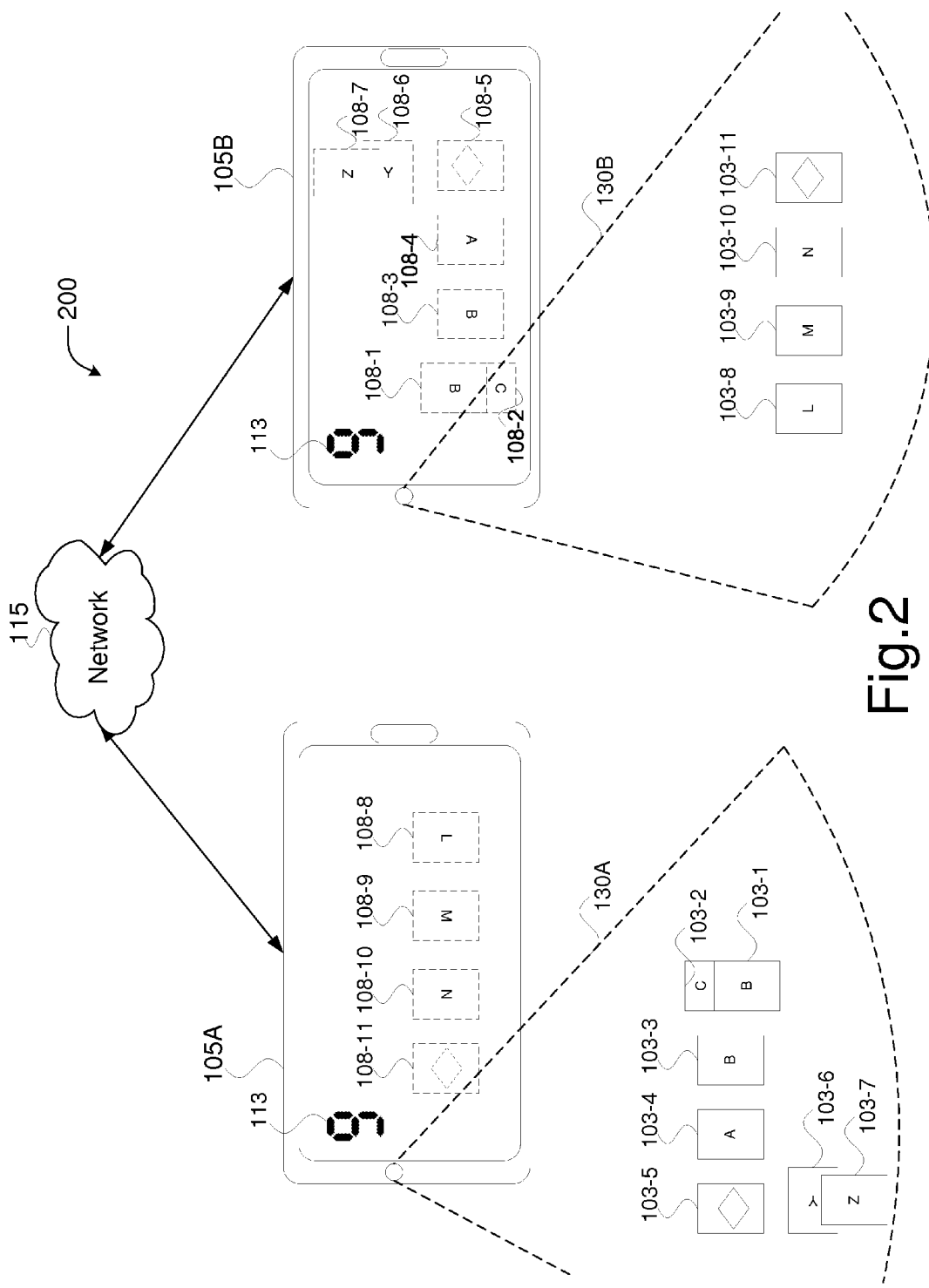
Figure 3:
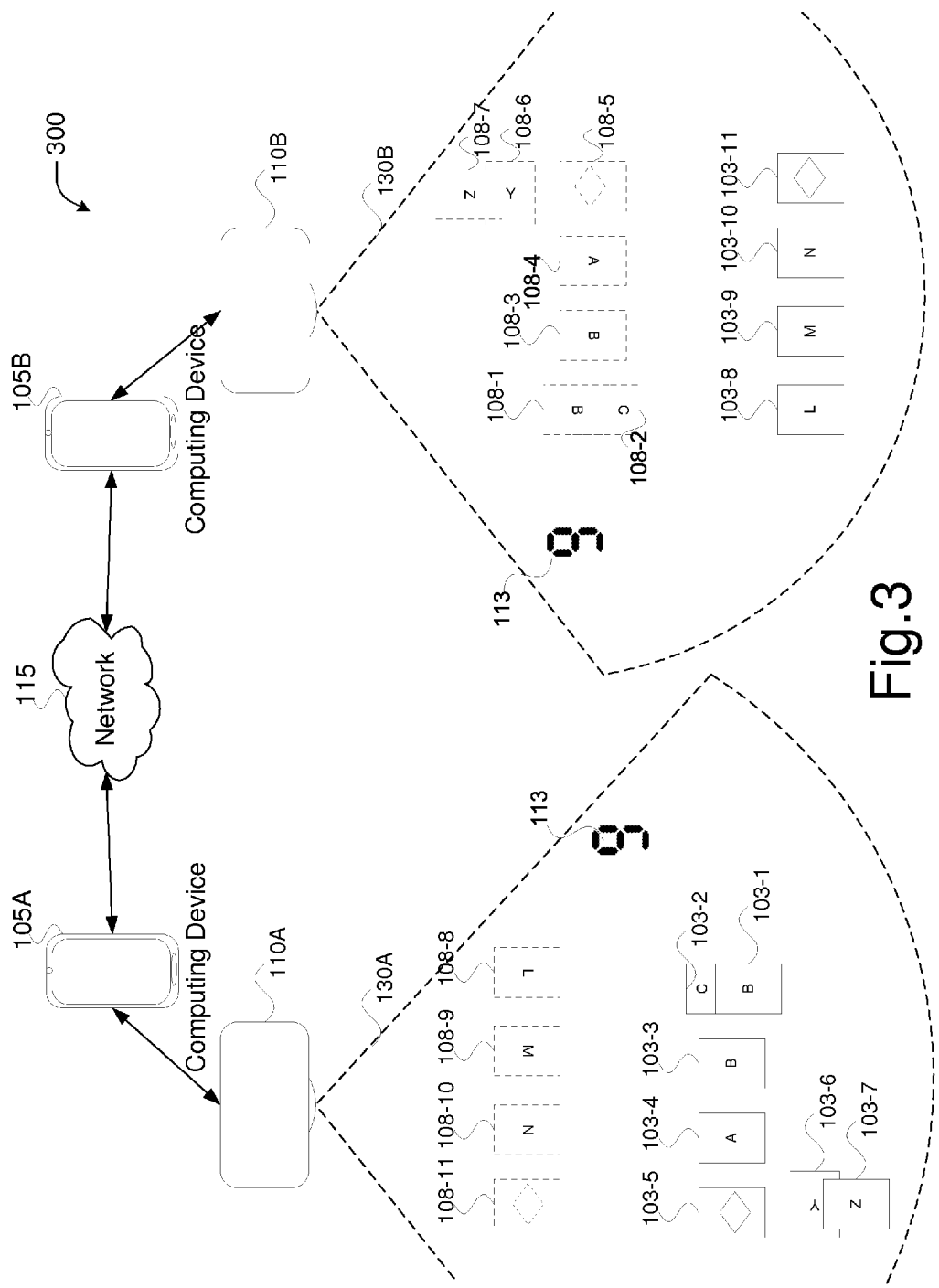
Figure 4:
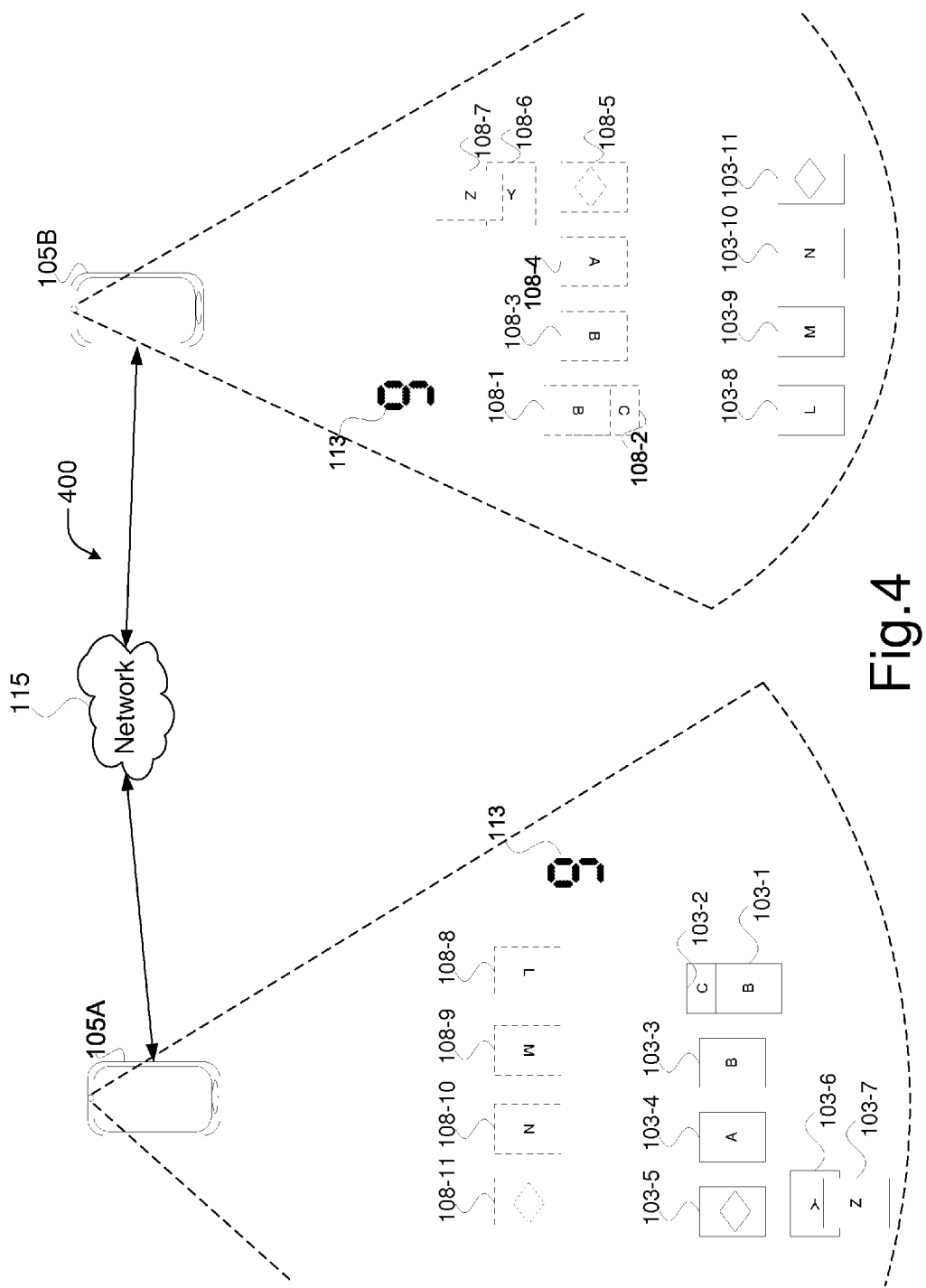
Figure 5:
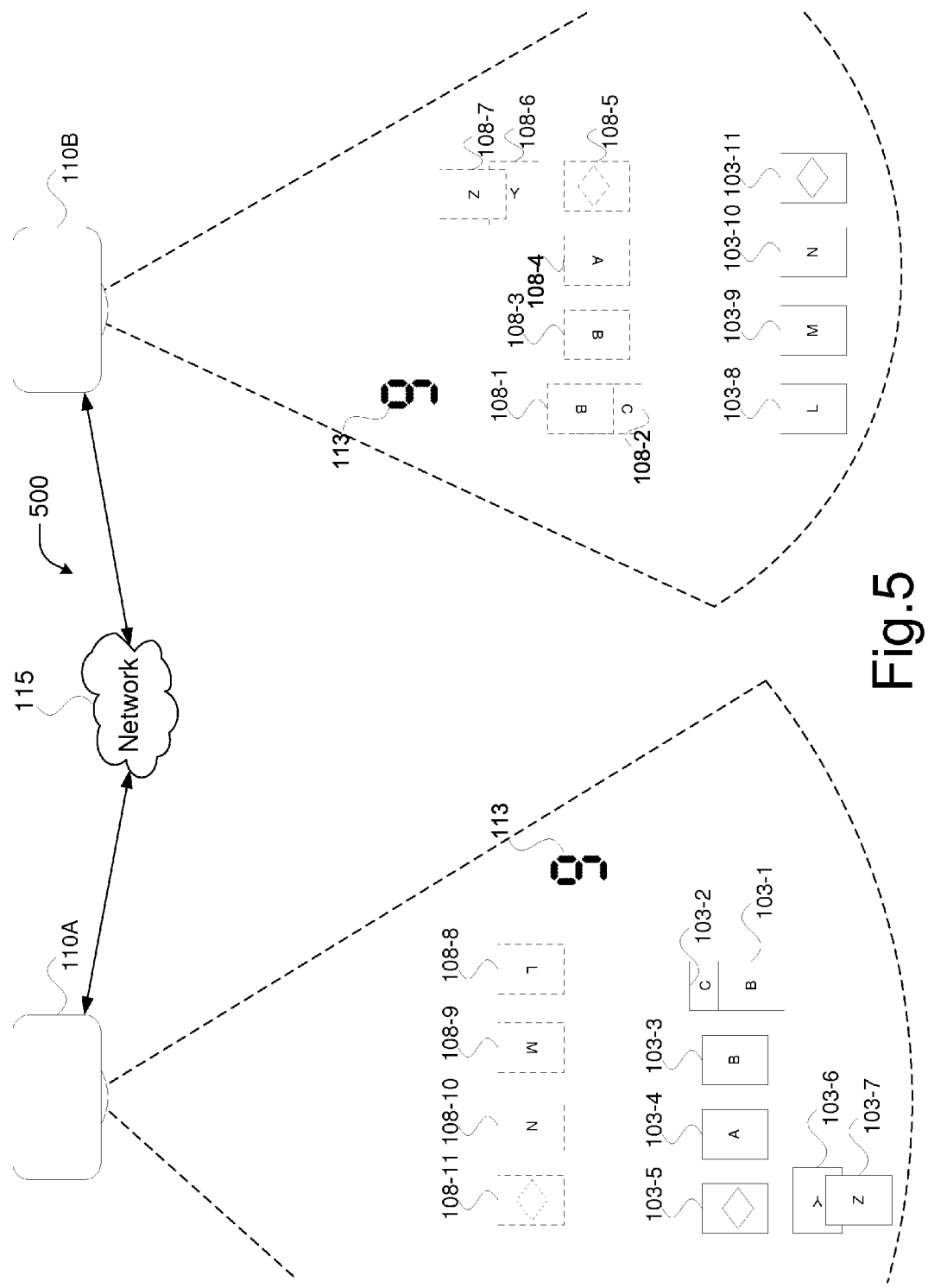
Figure 6:
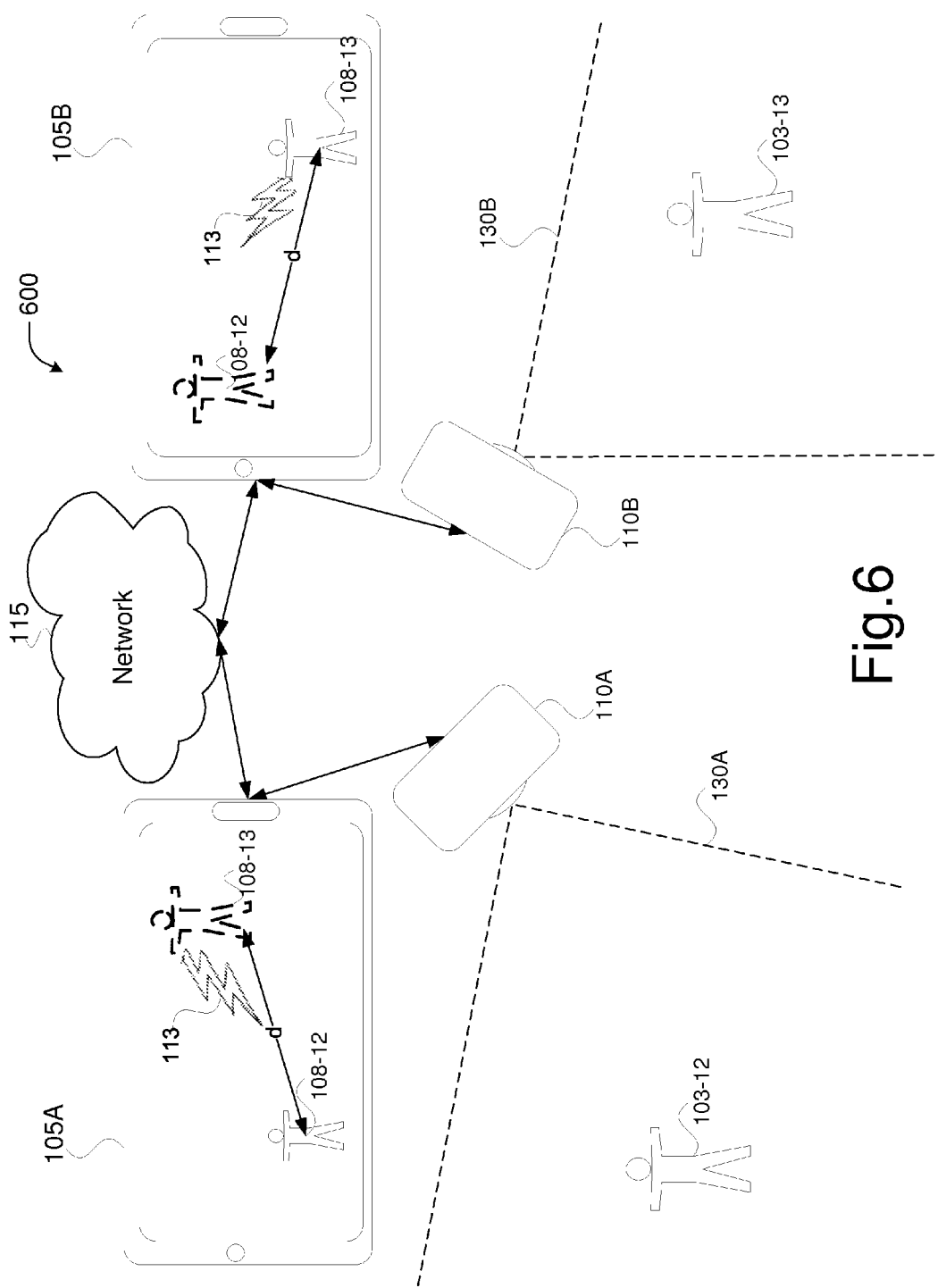
Figure 7:
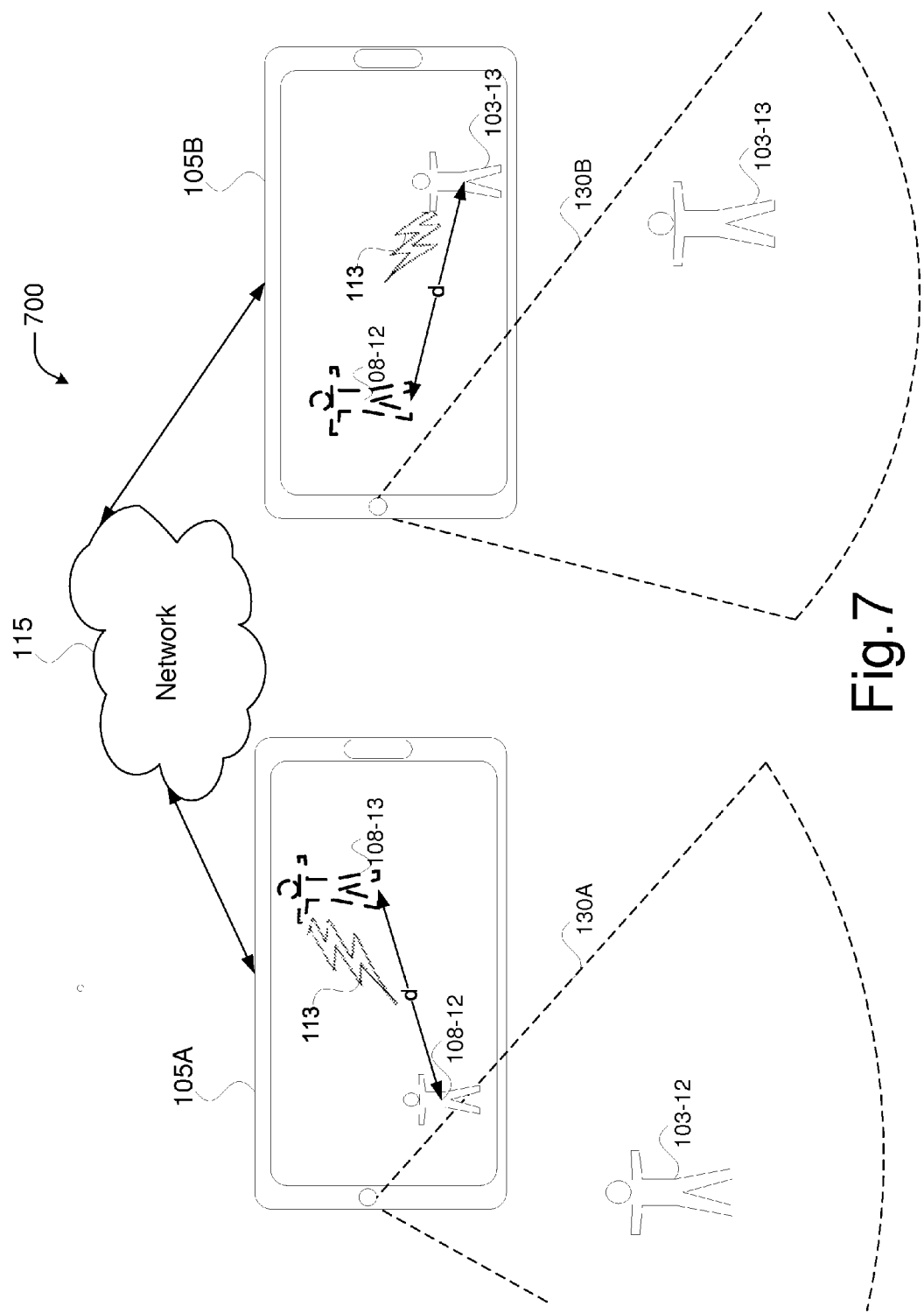
Figure 8:
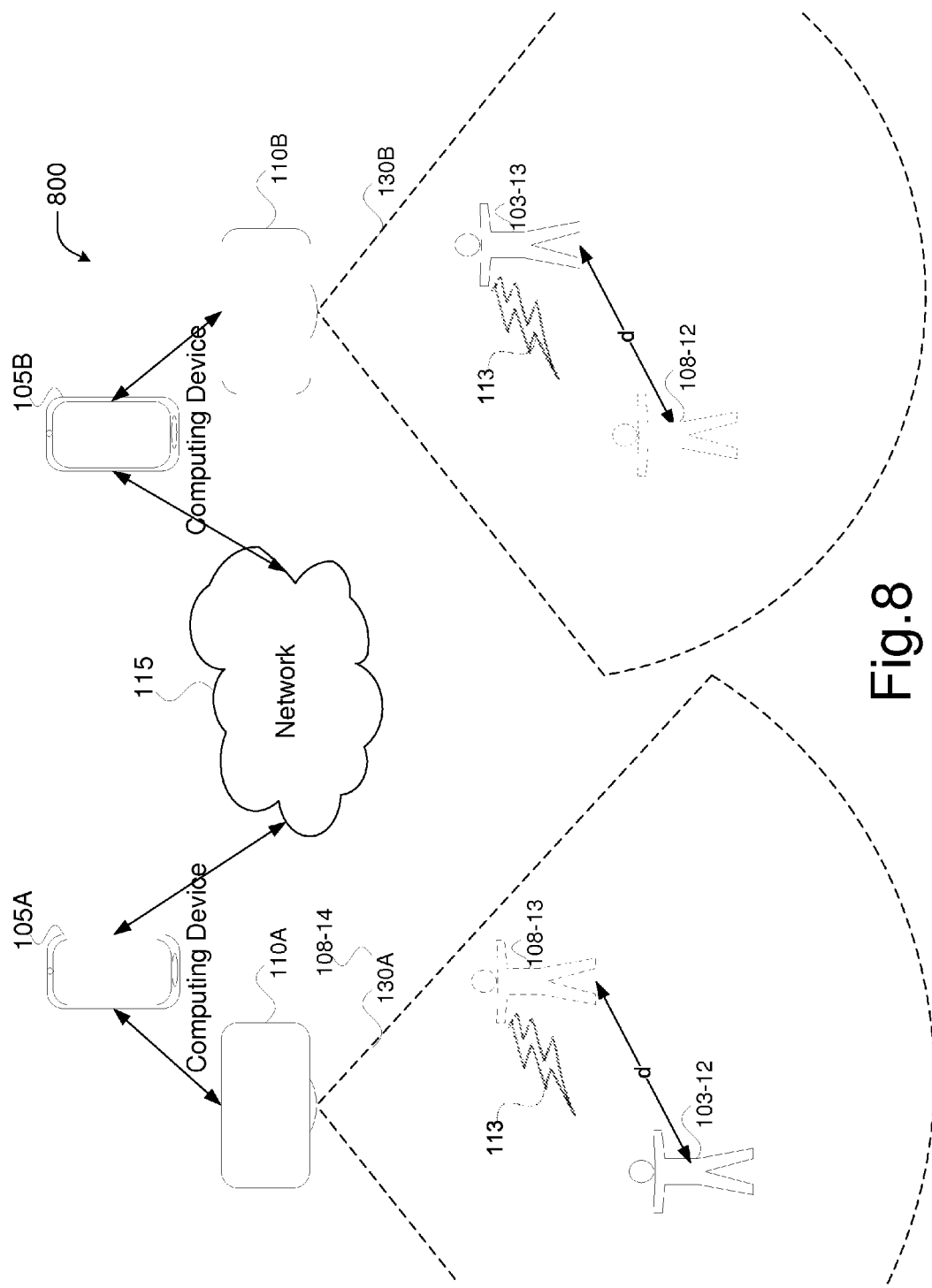
Figure 9:
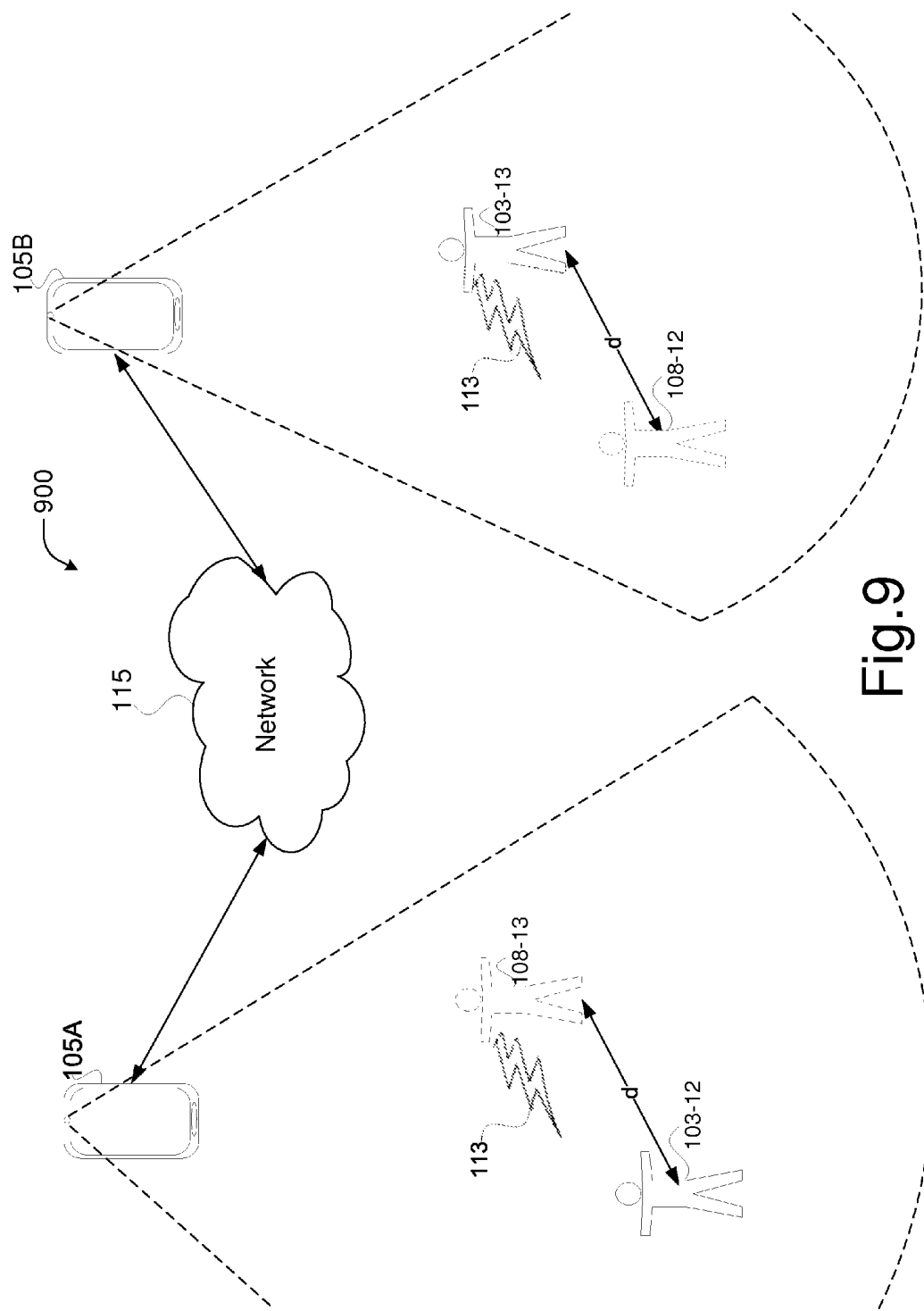
Figure 10:
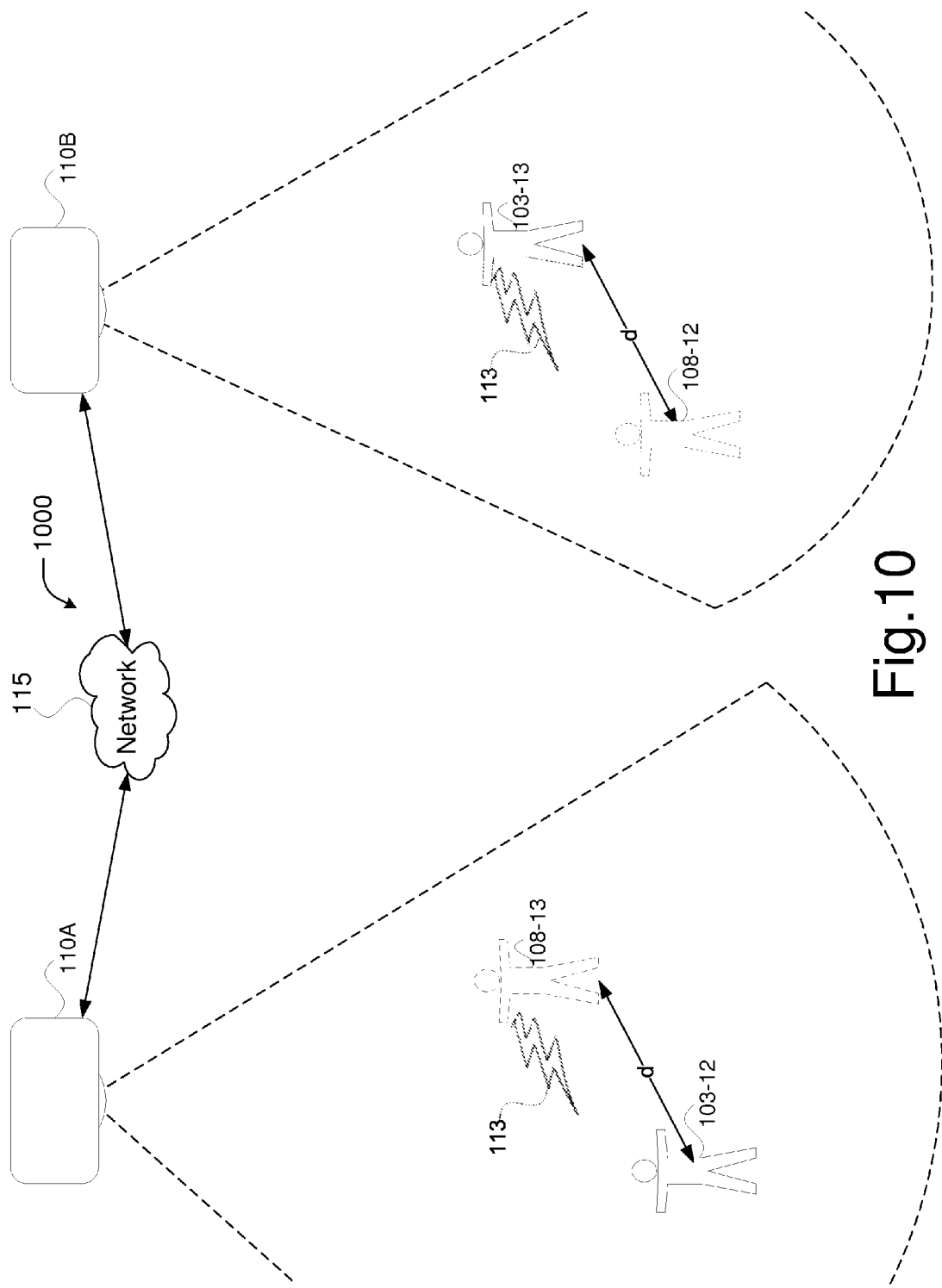

Example embodiments disclosed herein provide apparatuses, systems, and methods for emulating physical interactions, such as gameplay with physical objects, over long distances or when the participants are not in a vicinity of one another. Example embodiments allow toys, cards, and/or other like physical objects in the presence of a first user to interact with toys, cards, and/or other like physical objects in the presence of a second user. The example embodiments are different than typical communications systems that allow users to view each other's physical objects over long distances, such as video conferencing systems and the like, because these typical communications systems do not emulate in-real-life (IRL) interactive experiences. Example embodiments emulate IRL interactions, such as gameplay, by first recognizing a new physical object in a field of view ("FOV") and zooming in on the new physical object in order to allow the remote user to see the details of the new physical object; and second, by superimposing an image, video clip, and/or animation within the FOV according to various interaction, e.g., game play, criteria or based on the physical objects with the FOV. In various embodiments, the superimposed image (also referred to herein as an "overlay image") may be displayed or projected on top of a physical object within the FOV and/or displayed or projected in a vacant area within the FOV such that both users may see the superimposed image on the physical object and/or in the vacant area. Example embodiments may also use counters for virtual property, points, time limits, turns, etc., and superimpose the counter/timer values on one or more objects or over a vacant area in the FOV. A user may then perform one or more gestures in the FOV, such as using hand gestures or altering an object's position/orientation, to initiate an animation and/or alter the displayed/projected overlay image. An audio sound may also be played in combination with the display of the overlay image. In some embodiments, an internet-based connection or telecommunications connection, such as a voice over internet protocol (VoIP) session and the like, may be used to provide the IRL interaction (game play) emulation and to allow the users to communicate with one another during a game. Various example embodiments may utilize a tablet PC, smartphone, or other like computing device with a touchscreen and embedded sensors. Various example embodiments may utilize a computing device communicatively coupled with sensors and/or projection devices (e.g., camera, speaker, microphone, etc.). In some embodiments, the sensors and/or projection devices may be incorporated into a stand. In various embodiments, the stand may be an arch with the sensors and/or projection devices at the apex of the arch, the stand may be a lamp-style stand where the sensors and/or projection devices are incorporated into the lamp-head portion of the stand, or the stand may provide a connection device that allows the stand to be attached to a wall or other like structure. For ease of understanding, the remaining description will be presented mainly in the context of gameplay, however, the disclosure is not so limited, and may be practiced and applied to other distance physical interactions Referring now to the figures. FIGS. 1-10 show remote play environments 100-1000 (collectively referred to as the "remote play environments", the "gaming environments", "game play environments", "remote gaming environments", and the like), respectively, in which game participants may emulate a IRL game or other like physical interaction, in accordance with various embodiments. FIG. 1 illustrates an example embodiment of a remote play environment 100 for emulating an IRL collectable card game (CCG) in which the computing devices 105A and 105B are coupled with remote play modules (RPMs) 110A and 110B, respectively; FIG. 2 illustrates an example embodiment of a remote play environment 200 for emulating an IRL CCG in which the computing devices 105A and 105B are not coupled with RPMs 110A and 110B; FIG. 3 illustrates another example embodiment of a remote play environment 300 for emulating an IRL CCG in which the computing devices 105A and 105B are coupled with RPMs 110A and 110B, respectively; FIG. 4 illustrates another example embodiment of a remote play environment 400 for emulating an IRL CCG in which the computing devices 105A and 105B are not coupled with RPMs 110A and 110B; FIG. 5 illustrates another example embodiment of a remote play environment 500 for emulating an IRL CCG in which the RPMs 110A and 110B are used without the computing devices 105A and 105B; FIG. 6 illustrates an example embodiment of a remote play environment 600 for emulating IRL analog toy game play in which the computing devices 105A and 105B are coupled with RPMs 110A and 110B, respectively; FIG. 7 illustrates an example embodiment of a remote play environment 700 for emulating IRL analog toy game play in which the computing devices 105A and 105B are not coupled with RPMs 110A and 110B; FIG. 8 illustrates another example embodiment of a remote play environment 800 for emulating IRL analog toy game play in which the computing devices 105A and 105B are coupled with RPMs 110A and 110B, respectively; FIG. 9 illustrates another example embodiment of a remote play environment 900 for emulating IRL analog toy game play in which the computing devices 105A and 105B are not coupled with RPMs 110A and 110B; and FIG. 10 illustrates another example embodiment of a remote play environment 1000 for emulating IRL analog toy game play in which the RPMs 110A and 110B are used without the computing devices 105A and 105B.

As shown in FIGS. 1-10, the remote play environments may include first objects 103-1 to 103-13 (collectively referred to as "first objects 103"), second objects 108-1 to 108-13 (collectively referred to as "second objects 108"), overlay image 113, computing devices 105A and 105B (collectively referred to as "computing devices 105" or "computing device 105"), RPM 110A and 110B (collectively referred to as "remote play modules 110", "remote play module 110", "RPMs 110" or "RPM 110"), network 115, and a field of view (FOV) 130A-B (collectively referred to as "field of view 130" or "FOV 130").

Figure 15:
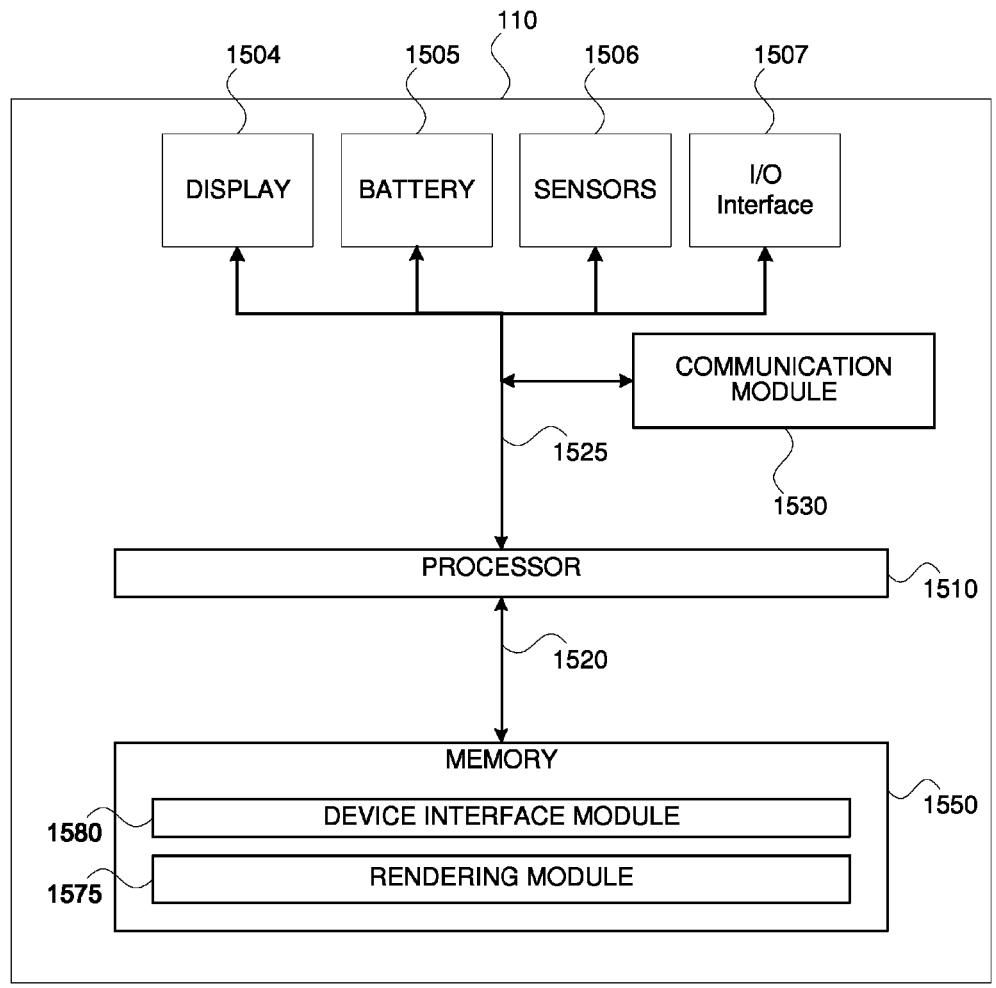
FIG. 15 illustrates the components of a remote play module, in accordance with various example embodiments.
Figure 16:
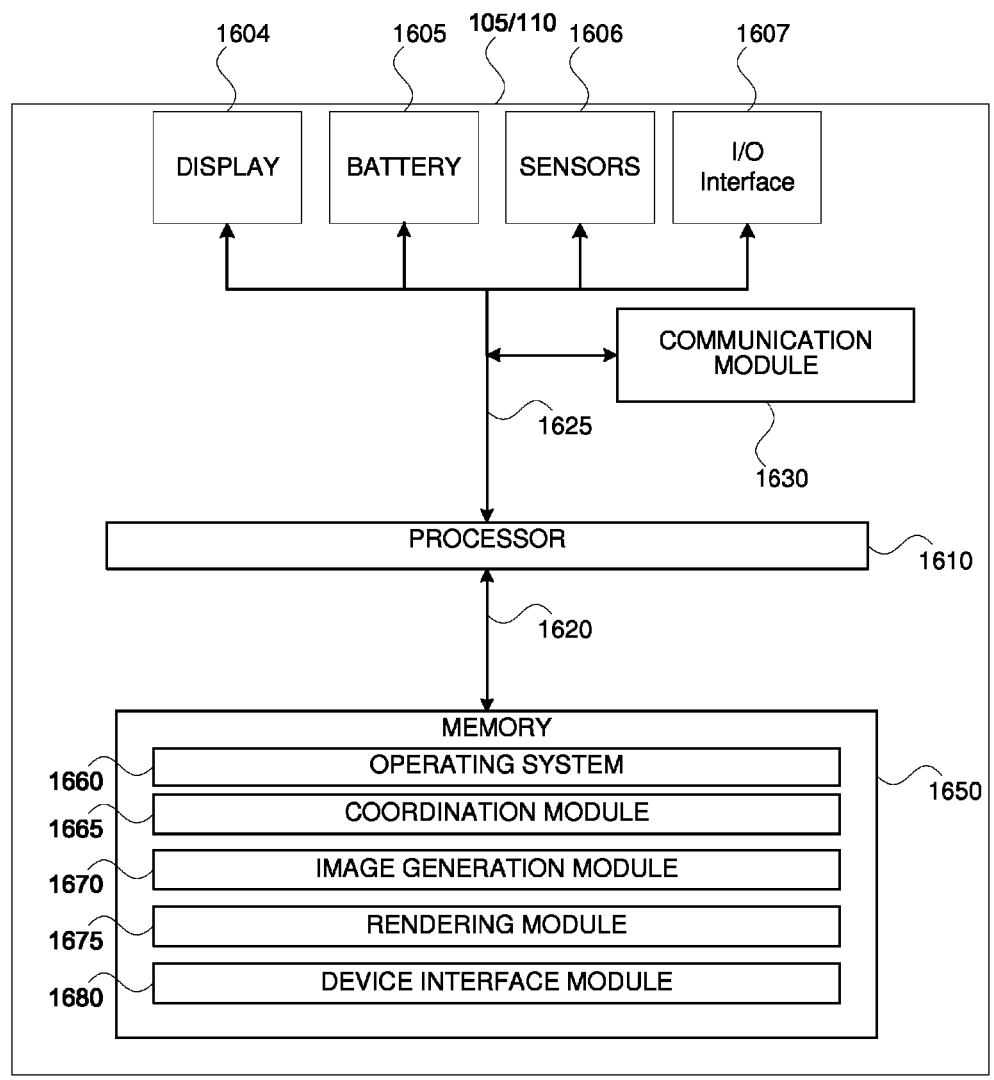
FIG. 16 illustrates the components of a computing device, in accordance with various example embodiments.

According to various embodiments, RPM 110 may be any physical device that may sense positions and/or orientations of one more physical objects and/or display images associated with one or more detected physical objects. The RPM 110 may include a communication module (e.g., communication module 1530 as shown in FIG. 15 or communication module 1630 as shown in FIG. 16), one or more memory devices (e.g., memory 1550 as shown in FIG. 15 or memory 1650 as shown in FIG. 16), one or more processors (e.g., processor 1510 as shown in FIG. 15, processor 1610 as shown in FIG. 16, one or more graphics processing units (GPUs), and the like), one or more sensors (e.g., sensors 1506 as shown in FIG. 15 or sensors 1606 as shown in FIG. 16), one or more output/feedback devices (e.g., display 1504 as shown in FIG. 15 or display 1604 as shown in FIG. 16), and/or other like components. RPMs 110 may be designed to sequentially and automatically carry out a sequence of arithmetic or logical operations; equipped to record/store digital data on a machine readable medium; generate and render digital images; and transmit and receive digital data.

The one or more sensors included with the RPMs 110 may be configured to sense, detect, capture, measure or otherwise obtain a position and/or an orientation of one or more objects (e.g., first objects 103) and convert the sensed positions and/or orientations into a signal and/or sensor data, which can be read by a computing device. The sensed positions may be referred to as position information (or alternatively "position data"), and the sensed orientations may be referred to as orientation information (or alternatively "orientation data"). Once the sensor data is recorded, the sensor data may be reported or otherwise transmitted to a corresponding computing device 105 for processing and transmission to another computing device 105.

The one or more sensors may include one or more motion capture devices that may be configured to capture motion by detecting a change in position of a body (e.g., one of the first objects 103) relative to its surroundings (e.g., one or more other first objects 103), or by detecting a change in the surroundings relative to the body. In such embodiments, one or more sensors may be configured to measure the strength and/or speed of a body's motion. In various embodiments, motion may be detected by sound, opacity, reflection of transmitted electromagnetic energy (i.e., light), and/or other like means of detecting motion. In various embodiments, one or more sensors may include one or more image sensors (e.g., one or more charged-coupled devices (CCD), one or more active pixel sensors (APS), and/or any other like image sensors), which may be configured to form images by detecting electromagnetic radiation (e.g., visible light waves) passing through or reflecting off of objects, and converting the electromagnetic radiation into electrical signals. The one or more sensors may be used to detect a shape of one or more first objects 103 within a FOV 130, detect content printed on one or more first objects 103 within a FOV 130, detect one or more gestures performed by a game participant, determine whether a new first object 103 has been placed in a FOV 130, detect a change of position and/or orientation of a first object 103 already in s FOV 130, and/or the like.

By way of example, referring to FIGS. 1, 3, and 5, the first objects 103-1 to 103-11 may represent playing cards, tiles, and the like, wherein the one or more sensors of RPM 110A may detect a position and/or orientation of the first objects 103-1 to 103-7 within FOV 130A and the one or more sensors of RPM 110B may detect a position and/or orientation of the first objects 103-8 to 103-11 within FOV 130B. Furthermore, the RPM 110A may detect one or more images printed on the first objects 103-1 to 103-7 (e.g., "B" on first object 103-1, a diamond on first object 103-5, etc.), and the RPM 110B may detect one or more images printed on the first objects 103-8 to 103-11 (e.g., "L" on first object 103-8, the diamond on first object 103-11, etc.). By way of another example, referring to FIGS. 6, 8, and 10, the first objects 103-12 and 103-13 may represent analog toys, wherein the one or more sensors of RPM 110A may detect a position and/or orientation of the first object 103-12 within FOV 130A and the one or more sensors of RPM 110B may detect a position and/or orientation of the first object 103-13 within FOV 130B. Furthermore, the RPM 110A may detect a size of first object 103-12, a shape of first object 103-12, a color of first object 103-12, and/or one or more images printed on the first object 103-12. The RPM 110B may detect a size of first object 103-13, a shape of first object 103-13, a color of first object 103-13, and/or one or more images printed on the first object 103-13.

Additionally, as noted previously, the one or more sensors may detect one or more gestures performed by a game participant. The gestures may include any action or movement made by a user, which may include altering a position and/or orientation of one or more first objects 103, and/or altering a position and/or orientation of one or more body parts of the participant. By way of example, a gesture may include flipping a card, moving a position/orientation of an analog toy, movement of the hands, face, or other body parts, etc.

In some embodiments, the one or more sensors may include a microphone configured to obtain one or more voice commands issued by a user of the RPM 110 and/or computing device 105. In such embodiments, the one or more voice commands may be recorded and included with the sensor data. The voice commands may include specific sounds or words that are pronounced by the user of the RPM 110. It should be noted that the sounds or words do not have to be previously known in any human language, but rather, the sounds or words may only be required to be repeatable by the user. In various embodiments, the RPM 110 may be configured to record voice commands, and communicate those recordings to the computing device 105 for voice recognition. In other embodiments, the RPM 110 may be configured to perform the voice recognition of the voice command gestures. The voice recognition methods and systems are known or commercially available, and are readily implemented by persons having ordinary skill in the art, particularly in light of the disclosure herein.

In various embodiments, RPM 110A may include or otherwise be associated with a field of view (FOV) 130A and RPM 110B may include or otherwise be associated with a field of view (FOV) 130B (see e.g., FIGS. 1, 3, 5-6, 8, and 10). In some embodiments, the computing device 105A may be associated with FOV 130A and the computing device 105B may be associated with FOV 130B (see e.g., FIGS. 2, 4, 7, and 9). The FOV 130 may define an area or region in which one or more first objects 103 are to be placed, and an area or region in which one or more second objects 108 and/or overlay objects 113 are to be displayed or projected. In various embodiments, the size and shape of the FOV 130 may be set using the RPM 110, while in some embodiments, the size and shape of the FOV 130 may be adjusted using the computing device 105 coupled with the RPM 110 (e.g., computing device 105A coupled with RPM 110A as shown in FIGS. 1, 3, 6, 8, and 10). In such embodiments, a user of the computing device 105 may adjust the FOV 130, and/or the computing device 105 may determine a shape and/or size of the FOV 130 based on characteristics of the RPM 110, such as lens attributes, position/orientation of the RPM 110 or RPM stand (see e.g., FIGS. 12-14), and the like. In some embodiments, the size and/or shape of the FOV 130 may be adjusted using a digital zoom. It should be noted that although FIGS. 1-10 show the FOV 130 as having a substantially conical shape, in various embodiments, the FOV 130 may have any two dimensional or three dimensional shape. Furthermore, in some embodiments, the size and/or shape of the FOV 130 may be increased or otherwise adjusted according to some game-related value/criteria/rules.

The RPM 110 may include a display device, which may be any type of output device that is able to present information in a visual form based on received electrical signals. The display device may be used to display one or more images associated with second objects 108-1 to 108-13. In most embodiments, the display device may be an image projector or video projector (also referred to as a "projector") that may project an image or moving images onto a surface or screen based on a received signal. It should be noted that the term "display device" as used herein may be synonymous with the term "projector". The projector may be a handheld projector, pocket projector, mobile projector, pico projector, a mini beamer, a cathode ray tube (CRT) projector, a liquid crystal display (LCD) projector, a digital light processing (DLP) projector, a liquid crystal on silicon (LCoS) projector, a light emitting diode (LED) projector, a laser diode projector, and/or any other like projection device. Such embodiments are shown by FIGS. 3, 5, 8, and 10. In various embodiments, instead of utilizing a projector or in addition to utilizing a projector, the images associated with the second objects 108 may be displayed on a display device of the computing device 105. Such embodiments are shown by FIGS. 1 and 6. The aforementioned projector device technologies are generally well known, and a description of the functionality of the projector devices is omitted for brevity.

In some other embodiments, instead of including its own display device, the RPM 110 may be coupled with a monitor that is separate than the computing device 105 and the RPM 110 (not shown). The monitor may include LED display devices, organic LED (OLED) display devices, LCD devices, quantum dot display devices, and/or any other like display device. In embodiments where the RPM 110 is coupled with a monitor, the monitor may be coupled with the RPM 110 by way of a wired connection, such as RCA connectors, a video graphics array (VGA) connector, a digital visual interface (DVI) connector and/or mini-DVI connector, a high-definition multimedia interface (HDMI) connector, an S-Video connector, and/or the like. Furthermore, the monitor may be coupled with the RPM 110 via a wireless connection and operate in conjunction with one or more remote display protocols, such as the wireless gigabit alliance (WiGiG) protocol, the remote desktop protocol (RDP), PC-over-IP (PCoIP) protocol, the high-definition experience (HDX) protocol, and/or other like remote display protocols. The aforementioned display device technologies are generally well known, and a description of the functionality of the display devices is omitted for brevity.

In various embodiments, the RPM 110 may also include one or more audio output devices. In most embodiments, the audio output devices may be embedded components of the RPM 110 and/or the audio output devices may include one or more external audio devices that may be communicatively coupled with the RPM 110 via a wired (e.g., USB, via an audio jack, and the like) or wireless connection (e.g., a Bluetooth and/or Bluetooth low energy (BLE) signal, WiFi signal, Infrared signal, ANT and/or ANT+ signals, Long Term Evolution (LTE) Proximity Services (ProSe), etc.). The external audio devices may include a Bluetooth earpiece or headphones, one or more speakers, etc. The one or more audio output devices may be used to play an audio output when an image is rendered and/or displayed. The files associated with the audio output may be stored in a computer-readable medium of the computing device 105, stored in a computer-readable medium of the RPM 110, and/or the output files may be streamed or otherwise provided to the computing device 105 and/or the RPM 110 from a content provider (not shown) on-demand, which may then be output via the embedded audio device and/or an external audio device. Additionally in various embodiments, an audio output (e.g., a sound effect, music file, etc.) may indicate one or more in-game events, such as success/failure of an action, increase/decrease in points, and the like. The sound effects that vary in tone, sequence, and/or amplitude, and the variations in tone, sequence, and/or amplitude may be used to indicate the level of success/failure, increase/decrease of point values, and/or other like in-game events. In some embodiments, the audio output may include corresponding effects to indicate different in-game event intensities, such as by using a fizzling sound and the like. In other embodiments, a sound effect may be a recorded or synthesized utterance, which may provide a message or other like indication of a game-related event.

In various embodiments, the RPM 110 may also include a network interface configured to connect the RPM 110 to one or more other hardware computing devices (e.g., computing devices 105, an external display device, an external audio output device, etc.) wirelessly via a transmitter and a receiver (or optionally a transceiver) and/or via a wired connection using a communications port. The network interface and the transmitter/receiver and/or communications port may collectively be referred to as a "communication module". The wireless transmitter/receiver and/or transceiver may be configured to operate in accordance with one or more wireless communications standards. For example, the RPM 110 may directly connect with one or more devices via the direct wireless connection by using, for example, Bluetooth and/or BLE protocols, WiFi protocols, Infrared Data Association (IrDA) protocols, ANT and/or ANT+ protocols, LTE ProSe standards, and the like. For direct wireless connections, the RPM 110 may utilize one or more proximity sensing methods to detect one or more devices within a vicinity of the RPM 110. In some embodiments, the RPM 110 may utilize the communication module to scan the remote play environments 100-1000 for signals that are broadcast by external devices (e.g., a corresponding computing device 105, an external audio device, and/or an external display device), which may include one or more data packets. The data packets may include an identifier or other like identifying information, such as a device name (e.g., serial number), device type, position information, and/or other like information. The RPM 110 may then extract the information in order to establish a direct communications device to communications device (D2D) session with the external output device. The D2D session may include performing various signaling operations with a network element (e.g., an evolved Node B, a radio access technology, and the like) in accordance with LTE ProSe standards. The RPM 110 may then transmit information, as one or more data packets, to be processed by a computing device 105 and/or output by an external output device. The communications port may be configured to operate in accordance with one or more known wired communications protocol, such as a serial communications protocol (e.g., the Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), and/or a network communications protocol (e.g., Ethernet, token ring, Fiber Distributed Data Interface (FDDI), and/or other like network communications protocols). Using the wireless or wired connection, RPM 110 may be configured to send/receive data to/from computing device 105 or one or more external output devices during the established D2D session.

In some embodiments, such as the embodiments shown by FIGS. 5 and 10, RPM 110 may connect with one or more devices via network 115. In such embodiments, the RPM 110 may be configured to send/receive data to/from one or more other hardware computing devices, and/or network elements, such as a router, switch, hub, or other like network devices, via the communication module. The RPM 110 may also be configured to obtain a data (in the form of a data stream, data packets, and/or other like messages) from a network element via the communication module, and utilize the data according to the various example embodiments described herein. In such embodiments, RPM 110 may be configured to operate in accordance with one or more wireless communications protocols and/or one or more cellular phone communications protocols, such as the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, VoIP, Wi-MAX, LTE, and/or any other wireless communication protocols.

According to various embodiments, computing devices 105 may be physical hardware computing devices capable of communicating with a one or more other hardware computing devices (e.g., RPMs 110, one or more servers (not shown), one or more associated databases (not shown), and the like) via a communication module, such that computing device 105 is able to receive one or more signals and/or data streams from the other devices in the remote play environments. Computing devices 105 may include a communication module (e.g., communication module 1630 as shown in FIG. 16), one or more memory devices (e.g., memory 1650 as shown in FIG. 16), one or more processors (e.g., processor 1610 as shown in FIG. 16), one or more sensors (e.g., sensors 1606 as shown in FIG. 16), one or more output/feedback devices (e.g., display 1604 as shown in FIG. 16), and/or other like components. Computing devices 105 may be designed to sequentially and automatically carry out a sequence of arithmetic or logical operations; equipped to record/store digital data on a machine readable medium; and transmit and receive digital data via one or more network devices. Computing devices 105 may include devices such as desktop computers, laptop computers, mobile computing devices (e.g., smart phones, tablet personal computers, wearable computing devices, handheld messaging devices, personal data assistants, electronic book readers, and the like), a home or local server, and/or any other physical or logical device capable of recording, storing, and/or transferring digital data via a connection to a network device.

Computing devices 105 may include a network interface configured to connect computing device 105 to one or more other devices wirelessly via a transmitter and a receiver (or optionally a transceiver) and/or via a wired connection using a communications port. The network interface and the transmitter/receiver and/or communications port may collectively be referred to as a "communication module". The wireless transmitter/receiver and/or transceiver may be configured to operate in accordance with one or more wireless communications standards. For example, the computing device 105 may directly connect with one or more devices via the direct wireless connection by using, for example, Bluetooth and/or BLE protocols, WiFi protocols, IrDA protocols, ANT and/or ANT+ protocols, LTE ProSe standards, and the like as discussed previously. In such embodiments, the computing device 105 may utilize one or more proximity sensing methods to transmit an identifier to devices within a vicinity of the computing device 105 (e.g., RPM 110 and/or one or more external output devices) and establish a D2D communications session. The communications port may be configured to operate in accordance with one or more known wired communications protocol, such as a serial communications protocol (e.g., the Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), and/or a network communications protocol (e.g., Ethernet, token ring, Fiber Distributed Data Interface (FDDI), and/or other like network communications protocols). Using the wireless or wired connection, computing device 105 may be configured to send/receive data to/from RPM 110. Computing devices 105 may be configured to send/receive data to/from one or more other hardware computing devices, and/or network elements, such as a router, switch, hub, or other like network devices, via the network interface using the wired connection and/or the wireless connection. Computing devices 105 may be configured to obtain a data (in the form of a data stream, data packets, and/or other like messages) from a network element via the network interface, and utilize the data according to the various example embodiments described herein. Computing devices 105 may communicate over the network 115 in accordance with one or more wireless communications protocols and/or one or more cellular phone communications protocols. For example, computing device 105 may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, LTE, and/or any other "wireless" communication protocols, including RF-based, optical, and so forth.

Computing devices 105 may include or be otherwise associated with various input and output/feedback devices to enable user interaction with the computing device 105 and/or peripheral components or devices associated with the computing device 105 by way of one or more user interfaces or peripheral component interfaces. The user interfaces may include, but are not limited to a physical keyboard or keypad, a touchpad, a display device (touchscreen or non-touchscreen), speakers, microphones, image sensors, haptic feedback devices and/or one or more actuators, and the like. The display device may be any type of output device that is able to present information in a visual form based on received electrical signals. The display device may be used to display one or more images associated with second objects 108-1 to 108-13 and/or one or more overlay images 113. In various embodiments, the computing device 105 may include a touchscreen display device (e.g., as shown by FIGS. 1-4 and 6-9) and/or a projector device (e.g., as shown by FIGS. 4 and 10). The projector device may be an image projector or video projector (also referred to as a "projector") that may project an image or moving images onto a surface or screen based on a received signal. In most embodiments, the projector may be a handheld projector, pocket projector, mobile projector, pico projector, a mini beamer, a DLP projector, a LCoS projector, a LED projector, a laser diode projector, and the like. Such embodiments are shown and described with regard to FIGS. 4 and 9. In various embodiments, the computing device 105 may utilize an external projector by using the one or more wireless communications protocols. For example, the computing devices 105 may connect with, or otherwise utilize an RPM 110 (e.g., RPM 110A being utilized by computing device 105A as shown by FIGS. 3 and 8). Such external projectors may include a CRT projector, a LCD projector, any of the aforementioned projection devices, and/or any other like projection device. In various embodiments, instead of utilizing a projector or in addition to utilizing a projector, the images associated with the second objects 108 and/or the overlay images 113 may be displayed on a display device of the computing device 105. Such embodiments are shown and described with regard to FIGS. 1-2 and 6-7. Furthermore, using the one or more wireless communications protocols, the computing devices 105 may connect with, or otherwise utilize one or more external display devices (e.g., TVs or "smart TVs", a computing device and associated displays, augmented reality head-mounted (or helmet-mounted) devices, etc.). The aforementioned projector device technologies and display device technologies are generally well known, and a description of the functionality of the projector devices and/or the display devices is omitted for brevity.

The images associated with second objects 108 may be graphical representations that represent a corresponding second objects 108. As shown in FIGS. 1-10, the images associated with second objects 108 are represented by dashed lines. For example, referring to FIG. 1, the image associated with second object 108-8 displayed by computing device 105A is a dashed lined version of first object 103-8 that is detected by computing device 105B. It should be noted that the term "first object" as used herein may refer to an object that is physically present within a local device's field of view, and the term "second object" as used herein may refer to an object that is physically present within a remote device's field of view. Therefore, the one or more first objects 103 detected by the computing device 105B may be second objects from the perspective of computing device 105A. Furthermore, the one or more first objects 103 detected by the computing device 105A may be second objects from the perspective of computing device 105B. The images associated with each second object 108 may be generated by an image generation module (e.g., image generation module 1670 as described with regard to FIG. 16) and/or a rendering module (e.g., the rendering module 1675 as described with regard to FIG. 16, or the rendering module 1575 as described with regard to FIG. 15) according to one or more known methods for generating computer graphics.

For instance, the images associated with second objects 108 may be a two dimensional (2D) pixel graphic generated using a raster imaging application, a sprite graphic generated using a cascading style sheet (CSS), a vector graphic generated according to the scalable vector graphics (SVG) standard, a three dimensional (3D) graphic generated using one or more known 3D modeling applications, etc. The images associated with the second objects 108 may be rendered (i.e., displayed and/or projected) using a rendering module (e.g. rendering module 1580 as shown by FIG. 15 or rendering module 1680 as shown by FIG. 16). The image generation module and the rendering module may be one or more software applications that operate in conjunction with one or more hardware devices to generate and display images from a 2D or 3D model according to one or more known methods, such as by obtaining object data and/or image data from one or more data packets, processing the object data and/or image data into a scene file taking into account geometry information, viewpoint information, texture information, lighting information, shading information, and/or the like, and outputting the processed data to a digital image file, a raster image file, and the like. The hardware devices used by the image generation module and the rendering module may include a graphics processing unit (GPU) and/or any other like hardware device that is configured to perform complex rendering calculations. The generated images may be displayed according to one or more known video mapping or projection mapping methods, one or more known projection methods, and/or any other like known method for displaying images.

Overlay images 113 may be one or more images, animations, video clips, etc. that are displayed based on one or more in-game criteria, one or more of the first objects 103, and/or one or more the second objects 108. In various embodiments, the overlay images 113 may represent a counter value, where the counter value is indicative of an in-game virtual property value, such as points, health, power, etc. For example, referring to FIGS. 1-5, the overlay images 113 may indicate a counter value of "9", where the counter value represents a point value associated with one or more game participants. The counter value may also be based on one or more first objects 103 and/or one or more second objects 108. For example, referring again to FIGS. 1-5, the counter value of "9" may represent a point value printed on one of the first objects 103-1 to 103-7 within FOV 130A, which may be detected based on a scan of the first objects 103-1 to 103-7. By way of another example, the counter value of "9" may represent a point value printed on one of the second objects 108-8 to 108-11, which may be based on a scan of the first objects 103-8 to 103-11 within FOV 130B. The counter value may be set according to various game rules or other like in-game criteria. In various embodiments where the game play includes turns or other like periods of time for advancing game play, the overlay images 113 may indicate a timer value, which is indicative of a remaining time of a player's turn. In such embodiments, the overlay images 113 may be an animated image that counts down as the timer value is decremented, or an animated image that counts up as the timer value is incremented. For example, referring to FIGS. 1-5, the overlay images 113 may indicate a timer value of "9", where the timer value represents that a player has nine seconds remaining in the player's turn. It should also be noted that, although FIGS. 1-5 show one overlay image 113 within FOV 130A and one overlay image 113 within FOV 130B (each of which have a same value), the example embodiments are not limited thereto. In various embodiments, there may be multiple overlay images 113 within each FOV 130, and each overlay image 113 may represent a different value from each other overlay image 113. For example, each overlay image 113 may represent a corresponding counter value or timer value. Furthermore, it should also be noted that, although FIGS. 1-5 show that overlay images 113 are projected or otherwise displayed in a vacant area within the corresponding FOV 130, the example embodiments are not limited thereto. In various embodiments, the overlay images 113 may be projected or otherwise displayed on top of a corresponding first object 103. For example, a first overlay image 113 may represent a counter value indicative of a point value printed on first object 103-1, the first overlay image 113 may be in a form of a number of the counter value, and the first overlay image 113 may be projected or displayed on top of the first object 103-1 (not shown).

Moreover, the counter value and/or the timer values may be adjusted or altered based on one or more gestures detected by the computing devices 105 and/or the RPMs 110. For example, referring to FIGS. 1-2, a user of computing device 105A may perform a tap gesture on the touchscreen of the computing device 105A to indicate that he/she has finished his/her turn, indicate that he/she wishes to pause a timer associated with the overlay image 113, indicate that he/she desires to increase or decrease the counter value, etc. By way of another example, referring to FIGS. 3-5, where the overlay image 113 is projected into FOV 130A, the user of the computing device 105A and/or the RPM 110A may tap or perform another like gesture proximate to the overlay image 113 to indicate that he/she has finished his/her turn, indicate that he/she wishes to pause the timer associated with the overlay image 113, indicate that he/she desires to increase or decrease the counter value, etc. It should be noted that different gestures may indicate different actions to be performed to the counter/timer value, such as a first gesture used to indicate to increment the counter and a second gesture used to indicate to decrement the counter, and the like.

The overlay image 113 may be generated based on a scan of one or more first objects 103 within a given FOV 130, based on a position and/or orientation of one or more second objects 108, based on a distance d between two or more first objects 103, based on one or more gestures performed within a distance d of a first object 103 and/or a second object 108, and the like.

In various embodiments, the overlay images 113 may also be images, animations, and/or video clips that are projected or displayed based on the content of one or more first objects 103 and/or the content of one or more second objects 108 within an FOV 130. The overlay images 113 may be generated and rendered in a same or similar manner as the images associated with the second objects 108. In embodiments where the gaming environment is a CCG, an overlay image 113 may be based on images or information printed on a playing card. For example, referring to FIGS. 1-5, the computing device 105A and/or the RPM 110A may scan the FOV 130A and detect "A" printed on the first object 103-4, and according to various game play criteria, the computing device 105A and/or the RPM 110A may determine that an image, animation, and/or video clip associated with "A" is to be projected or displayed on top of the first object 103-4. Such an image, animation and/or video clip may be projected or displayed by the computing device 105A and/or the RPM 110A on top of the first object 103-4 (not shown), and such an image, animation and/or video clip may be projected or displayed by the computing device 105B and/or the RPM 110B on top of the second object 108-4 (not shown). In various embodiments, the image, animation or video clip to be projected or displayed by the computing device 105B and/or the RPM 110B may be generated by the computing device 105A and/or the RPM 110A and communicated to the computing device 105B and/or the RPM 110B for rendering, or the computing device 105B and/or the RPM 110B may independently generate and render the image/animation/video clip when the computing device 105B and/or the RPM 110B receives object data representative of the first object 103-4.

By way of another example, referring again to FIGS. 1-5, the computing device 105A and/or the RPM 110A may scan the FOV 130A and detect "C" printed on the first object 103-2 and "B" printed on first object 103-1, and according to various game play criteria, the computing device 105A and/or the RPM 110A may determine that an image, animation, and/or video clip associated with "B" being laid on top of "C" is to be projected or displayed in a vacant region of an FOV 130 or a vacant region of a display area of a display device, and such an image, animation or video clip may be projected or displayed the vacant region. Such an image, animation, and/or video clip may be projected or displayed by the computing device 105A and/or the RPM 110A in a vacant region of the FOV 130A (not shown) or within a display area of a display device of 105A (not shown), and such an image, animation, and/or video clip may be projected or displayed by the computing device 105B and/or the RPM 110B in a vacant region of FOV 130B (not shown) and/or within a display area of a display device of computing device 105B (not shown). In various embodiments, the image, animation, and/or video clip to be projected or displayed by the computing device 105B and/or the RPM 110B may be generated by the computing device 105A and/or the RPM 110A and communicated to the computing device 105B and/or the RPM 110B for rendering, or the computing device 105B and/or the RPM 110B may independently generate and render the image/animation/video clip when the computing device 105B and/or the RPM 110B receives object data representative of the first objects 103-1 and 103-2. It should be noted that, in some embodiments, and according to various game play criteria, an image/animation/video clip associated with "B" may be different than an image/animation/video clip associated with "C" when "B" and "C" are separate from one another (not shown). Additionally, an image/animation/video clip associated with "B" being laid on top of "C" (as shown by FIGS. 1-5) may be different than an image/animation/video clip associated with "C" being laid on top of "B" (not shown). Furthermore, an image/animation/video clip associated with "C" being laid parallel with, and underneath "B" (as shown by FIGS. 1-5) may be different than an image/animation/video clip associated with "C" being placed perpendicular to "B" in such a manner as shown by first objects 103-6 and 103-7.

In various embodiments, the overlay images 113 may also be images, animations, and/or video clips that are projected or displayed based on a size, shape, color, object type, etc. of one or more first objects 103 and/or a size, shape, color, object type etc. of one or more second objects 108 within an FOV 130. By way of example, as shown by FIGS. 6-10, the computing device 105A and/or the RPM 110A may detect the first object 113-12 within the FOV 130A and determine that an object type of the first object 103-12 is an analog figurine; and the computing device 105B and/or the RPM 110B may detect the first object 113-13 within the FOV 130B and determine that an object type of the first object 103-13 is another analog figurine. Based on a size, shape, color, object type, etc. of the first object 103-12 and/or the second object 108-13, the computing device 105A and/or the RPM 110A may generate the overlay image 113, which is in the form of a lightning bolt. The particular image, video, animation, etc. of the overlay image 113 may be chosen according to one or more game play criteria and/or design choices. Continuing with the instant example, one or more game play criteria may define that, when the first object 103-12 is within a distance d of the first object 103-13, a lightning bolt is to be rendered as emanating from the first object 103-13 to the first object 103-12. The lightning bolt overlay image 113 may then be rendered as a lightning bolt traveling from the first object 103-13 to the first object 103-12, when the first object 103-12 is moved to be within the distance d of the second object 103-13, or when the first object 103-13 is moved to be within the distance d of the second object 103-12. In such instances, the computing device 105A and/or the RPM 110A, may generate and render the lightning bolt animation as emanating from the second object 108-13 to the first object 103-12 when the second object 108-12 is moved to be within the distance d of the first object 103-13, or when the first object 103-13 is moved to be within the distance d of the second object 108-12. In instances where the first object 103-12 is moved by a user of the computing device 105A and/or RPM 110A to be within the distance d of the second object 108-13, the computing device 105A and/or the RPM 110A may communicate image data representative of the lightning bolt animation/video to the computing device 105B and/or the RPM 110B, which may then be used to generate and/or render the aforementioned lightning bolt animation/video. In some embodiments, the computing device 105B and/or the RPM 110B may generate and render the lightning bolt animation as emanating from the first object 103-13 to the second object 108-12, when the first object 103-12 is moved to be within the distance d of the second object 108-13, or when the second object 108-13 is moved to be within the distance d of the second object 103-12. Furthermore, the computing device 105B and/or the RPM 110B may communicate image data to the computing device 105A and/or the RPM 110A to generate and/or render the aforementioned lightning bolt animation/video. In various embodiments, instead of one of the computing devices 105A or 105B and/or the RPMs 110A or 110B generating the overlay image data to be communicated to the other computing device 105 or RPM 110, each computing device 105 and/or RPM 110 may separately generate and render an overlay image 113 when each computing device 105 and/or RPM 110 independently detects a change in position and/or orientation between the various first objects 103 within their FOV 130, and/or a change in position and/or orientation between one or more first objects 103 and one or more second objects 108.

In various embodiments, the computing devices 105 may also include one or more audio output devices. In most embodiments, the audio output devices may be embedded components of the computing devices 105 and/or one or more external audio output devices that may be communicatively coupled with the computing devices 105 via a wired (e.g., USB, via an audio jack, and the like) or wireless connection (e.g., a Bluetooth and/or Bluetooth low energy (BLE) signal, WiFi signal, Infrared signal, ANT and/or ANT+ signals, etc.). The external audio output devices may include a Bluetooth earpiece or headphones, one or more speakers, etc. The one or more audio output devices may be used to play an audio output when an image is rendered and/or displayed. The files associated with the audio output may be stored in a computer-readable medium of the computing device 105, stored in a computer-readable medium of the RPM 110, and/or the output files may be streamed or otherwise provided to the computing device 105 and/or the RPM 110 from a content provider (not shown) on-demand, which may then be output via the audio output device and/or a communicatively coupled output device. In various embodiments, an audio output (e.g., sound effects, etc.) may indicate one or more in-game events as discussed previously with respect to the RPM 110.

The computing device 105 may be equipped with location (or alternatively "geolocation"), positioning, and/or navigation circuitry, such as a Global Positioning System ("GPS") receiver, as well as software to convert received GPS signals into a location and/or position (within some margin of error). Computing devices 105 may also include one or more sensors that are the same or similar to the one or more sensors discussed above with regard to RPM 110, such as one or more imaging sensors and/or one or more microphones. The one or more sensors may also include devices such as an accelerometer, gyroscope, gravimeter, magnetometer, and/or another like devices that are configured to measure and/or detect a motion, an acceleration, and/or an orientation of the computing devices 105.

The computing devices 105 may be configured to run, execute, or otherwise operate one or more applications. The applications may include native applications, web applications, and hybrid applications. The native applications may be used for operating the computing device 105, such as using a camera or other like sensor of the computing device 105, GPS functionality of the computing device 105, an accelerometer of the computing device 105, cellular phone functionality of the computing device 105, and other like functions of the computing device 105. Native applications may be platform or operating system (OS) specific. Native applications may be developed for a specific platform using platform-specific development tools, programming languages, and the like. Such platform-specific development tools and/or programming languages may be provided by a platform vendor. Native applications may be pre-installed on computing devices 105 during manufacturing, or provided to the computing device 105 by an application server via a network (e.g. network 115). Web applications are applications that load into a web browser of the computing device 105 in response to requesting the web application from a service provider. The web applications may be websites that are designed or customized to run on a mobile device by taking into account various mobile device parameters, such as resource availability, display size, touchscreen input, and the like. In this way, web applications may provide an experience that is similar to a native application within a web browser. Web applications may be any server-side application that is developed with any server-side development tools and/or programming languages, such as PHP, Node.js, ASP.NET, and/or any other like technology that renders HTML. Hybrid applications may be a hybrid between native applications and web applications. Hybrid applications may be a standalone, skeletons, or other like application containers that may load a website within the application container. Hybrid applications may be written using website development tools and/or programming languages, such as HTML5, CSS, JavaScript, and the like. Hybrid applications use browser engine of the computing device 105, without using a web browser of the computing device 105, to render a website's services locally. Hybrid applications may also access mobile device capabilities that are not accessible in web applications, such as the accelerometer, camera, local storage, and the like. According to various embodiments, the various example embodiments for detecting one or more first objects 103 within a FOV 130, controlling one or more sensors to zoom-in on the one or more first objects 103, generating images associated with one or more second objects 108, and/or rendering one or more second objects 108 as described herein may be implemented as a native application, a web application, and/or a hybrid application. Such an application may be included in the computing device 105 or in the RPM 110 according to various example embodiments.

According to various embodiments, network 115 may be any network that allows computers to exchange data. Network 115 may include one or more network elements (not shown) capable of physically or logically connecting computers. The network 115 may include any appropriate network, including an intranet, the Internet, a cellular network, a local area network (LAN), a wide area network (WAN), a personal network or any other such network or combination thereof. Components used for such a system can depend at least in part upon the type of network and/or environment selected. Protocols and components for communicating via such a network are well known and will not be discussed herein in detail. Communication over the network 115 may be enabled by wired or wireless connections, and combinations thereof.

As shown in FIGS. 1-10, only two computing devices 105A and 105B, two RPMs 110, thirteen first objects 103-1 to 103-13, thirteen second objects 108-1 to 108-13, and two overlay images 113 are present. However, according to various embodiments, any number of computing devices, any number of RPMs, any number of first objects, any number of second objects, any number of overlay images, any number of servers (not shown), and/or any number of databases (not shown) may be present. For example, in various embodiments, the remote play environments 100-1000 may include three or more computing devices and/or associated RPMs 110 for multiplayer games. By way of another example, in some embodiments, a server and/or one or more databases may be implemented to account for game-related activities, such as keeping score and the like. The servers and/or databases may be virtual machines and/or they may be provided as part of a cloud computing service. In some embodiments, the servers and/or databases may reside on one physical hardware device, and/or may be otherwise fully integrated with one another. Thus, the depiction of the illustrative remote play environments 100-1000 in FIGS. 1-10 should be taken as being illustrative in nature, and should not be limited to the scope of the disclosure.

Furthermore, as shown by each of FIGS. 1-10, each of computing devices 105 and/or RPMs 110 have a same configuration, such as the RPMs 110 scanning for first objects 103 and the computing devices 105 displaying second objects 108 as shown by FIGS. 1 and 6; the computing devices 105 scanning for first objects 103 and displaying second objects 108 as shown by FIGS. 2 and 7; the RPMs 110 scanning for first objects 103 and displaying second objects 108, wherein the computing devices 105 operate as communications relay nodes as shown by FIGS. 3 and 8; the computing devices 105 scanning for first objects 103 and projecting second objects 108 as shown by FIGS. 4 and 9; and the RPMs 110 scanning for first objects 103 and projecting second objects 108. However, in various embodiments, each game participant may utilize a different computing device 105 and/or the RPM 110 configuration. For example, a remote play environment may include a first user may utilize the computing device 105A and the RPM 110A configuration as shown in FIG. 1 or 6, and a second user may utilize the computing device 105B configuration as shown in FIG. 4 or 9. Any combination of the configurations shown by FIGS. 1-10 may be utilized in accordance with the example embodiments disclosed herein.

Figure 11:
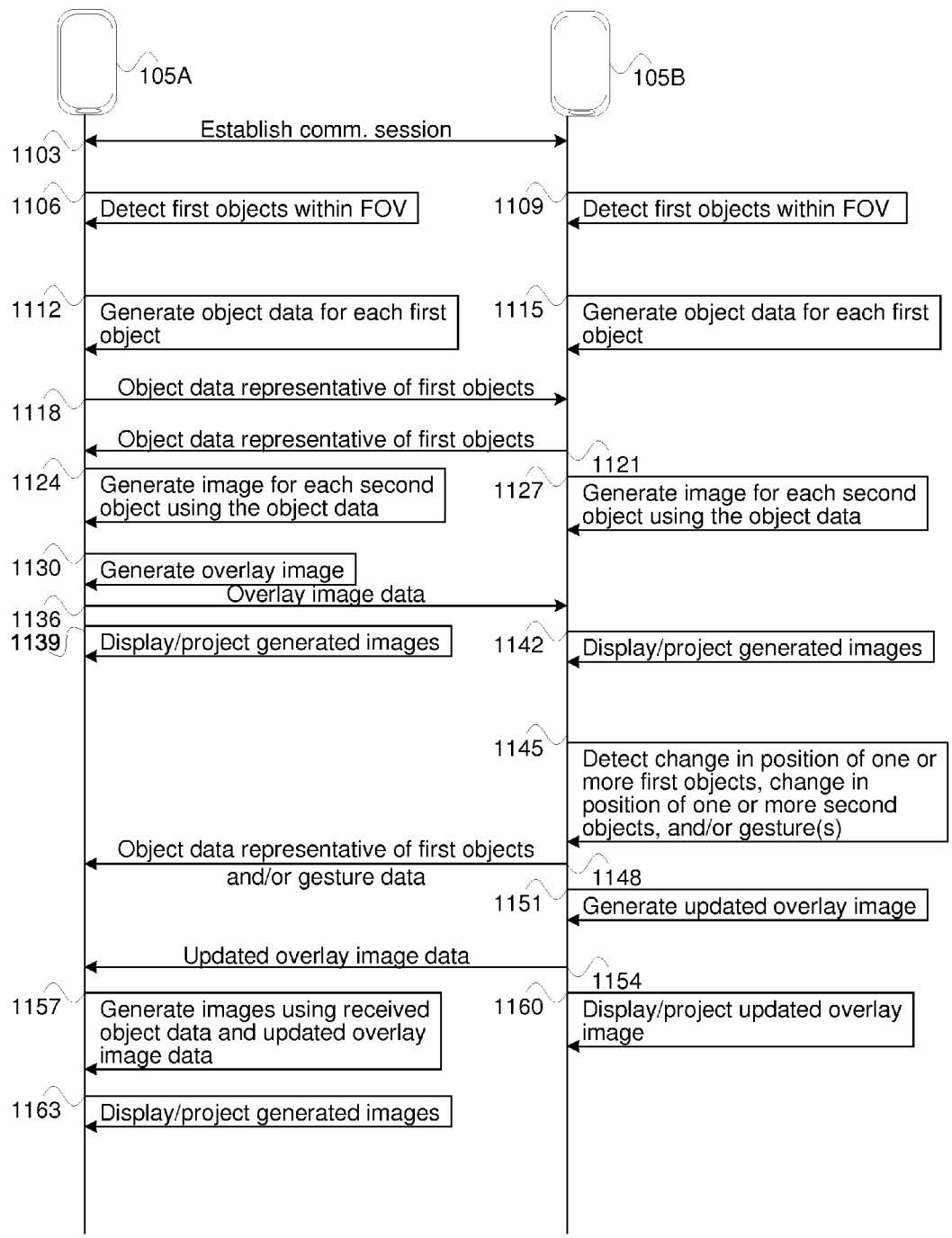
FIG. 11 illustrates a data flow diagram for devices operating in a remote play environment, in accordance with various example embodiments.

FIG. 11 illustrates a data flow diagram for the various devices operating in a remote play environments 100-1000, in accordance with various example embodiments. FIG. 11 illustrates the various communications and image generation/renderings between the computing devices 105A and 105B, as described with reference to FIGS. 1-4 and 6-9. However, it should be noted that in various embodiments, the computing devices 105 may be replaced by RPMs 110 (e.g., as shown in FIGS. 5 and 10).

Referring to FIG. 11, at operation 1103, the computing devices 105 establish a communications session via the network 115. The communications session may be any voice-based and/or multimedia-based communications session, including voice over internet protocol (VoIP); a session initiation protocol (SIP) session in combination with Real-time Transport Protocol (RTP) and/or RTP Control Protocol (RTCP) messages; Skype™ protocol session, a video conferencing session such as those defined by International Telecommunications Union (ITU) standards (e.g., H.320, H.264, H.239, V.80, etc.); and/or any other like communications session. The communications session may enable the user of the computing devices 105 to communicate image data and voice data according to known methods.

At operation 1106, computing device 105A detects one or more first objects 103 within FOV 130A, and at operation 1109, computing device 105B detects one or more first objects 103 within FOV 130B. In various embodiments, the computing devices 105 may detect the one or more first objects 103 within their corresponding FOV 130 using one or more embedded sensors (as shown by FIG. 2, 4, 7, or 9), or by controlling and/or instructing a corresponding RPM 110 to detect the one or more first objects 103 (e.g., as shown by FIG. 1, 3, 6, or 8). In embodiments where a computing device is not used, the RPMs 110 may detect the one or more first objects 103 within their corresponding FOVs 130 (e.g., as shown by FIGS. 5 and 10). Detecting the one or more first objects 103 may be accomplished using one or more known scanning techniques.

By way of example, referring to FIGS. 1 and 3, the computing device 105A may instruct or otherwise control the RPM 110A to perform a scan operation to detect the first objects 103-1 to 103-7 within the FOV 130A, and the computing device 105B may instruct or otherwise control the RPM 110B to perform a scan operation to detect the first objects 103-8 to 103-11 within the FOV 130B. By way of another example, referring to FIGS. 6 and 8, the computing device 105A may instruct or otherwise control the RPM 110A to perform a scan operation to detect the first object 103-12 within the FOV 130A, and the computing device 105B may instruct or otherwise control the RPM 110B to perform a scan operation to detect the first object 103-13 within the FOV 130B. By way of yet another example, referring to FIGS. 2 and 4, the computing device 105A may utilize one or more embedded sensors to perform a scan operation to detect the first objects 103-1 to 103-7 within the FOV 130A, and the computing device 105B may utilize one or more embedded sensors to perform a scan operation to detect the first objects 103-8 to 103-11 within the FOV 130B. By way of yet another example, referring to FIGS. 7 and 9, the computing device 105A may utilize one or more embedded sensors to perform a scan operation to detect the first object 103-12 within the FOV 130A, and the computing device 105B may utilize one or more embedded sensors to perform a scan operation to detect the first object 103-13 within the FOV 130B. By way of yet another example, referring to FIG. 5, the RPM 110A may utilize one or more embedded sensors to perform a scan operation to detect the first objects 103-1 to 103-7 within the FOV 130A, and the RPM 110B may utilize one or more embedded sensors to perform a scan operation to detect the first objects 103-8 to 103-11 within the FOV 130B. By way of yet another example, referring to FIG. 10, the RPM 110A may utilize one or more embedded sensors to perform a scan operation to detect the first object 103-12 within the FOV 130A, and the RPM 110B may utilize one or more embedded sensors to perform a scan operation to detect the first object 103-13 within the FOV 130B.

Referring back to FIG. 11, at operation 1112, the computing device 105A may generate object data for each of the detected first objects 103, and at operation 1115, the computing device 105B may generate object data for each of the detected first objects 103. The object data may include one or more features of the detected first objects 103, such as size, shape, color, content printed thereon, position, orientation, object type, and/or any other like features. At operation 1118, the computing device 105A may send the object data representing the detected first objects 103 to the computing device 105B, and at operation 1121, the computing device 105B may send the object data representing the detected first objects 103 to the computing device 105A.

At operation 1124, the computing device 105A may generate an image for each second object 108 using the object data received from the computing device 105B at operation 1121. At operation 1127, the computing device 105B may generate an image for each second object 108 using the object data received from the computing device 105A at operation 1118. As noted previously, a "first object" may be an object that is physically present within a local device's field of view (e.g., a first object 103 with FOV 130A is a first object 103 for computing device 105A and/or RPM 110A), and a "second object" may be an object that is physically present within a remote device's field of view (e.g., a first object 103 with FOV 130B is a second object 108 for computing device 105A and/or RPM 110A). Therefore, the one or more first objects 103 detected by the computing device 105B may be second objects from the perspective of computing device 105A. Furthermore, the one or more first objects 103 detected by the computing device 105A may be second objects from the perspective of computing device 105B. Accordingly, at operation 1124, the computing device 105A may generate an image for each object detected by computing device 105B, and at operation 1127, the computing device 105B may generate an image for each object detected by computing device 105A.

At operation 1130, the computing device 105A may generate an overlay image 113, and at operation 1136, the computing device 105A may send data associated with the overlay image 113 to the computing device 105B. The overlay image data may include information indicative of an image type, display position, display orientation, etc., which may be used by the computing device 105B for rendering the overlay image 113. In various embodiments, the computing device 105B may also generate an overlay image 113 instead of receiving overlay image data from the computing device 105A (not shown).

At operation 1139, the computing device 105A may display and/or project the generated images associated with the second objects 108 (i.e., first objects 103 detected by computing device 105B) and the generated overlay image 113 within the FOV 130A, and at operation 1142 the computing device 105B may display and/or project the generated images associated with the second objects 108 (i.e., first objects 103 detected by computing device 105A) and the generated overlay image 113 within the FOV 130B. A position and/or orientation at which the generated images are displayed/projected within the FOV 130A may be based on position/orientation information included with the object data received at operation 1121, and a position and/or orientation at which the generated images are displayed/projected within the FOV 130B may be based on position information included with the object data received at operation 1118.

At operation 1145, the computing device 105B may detect a change in position and/or orientation of one or more first objects 103, a change in position and/or orientation of one or more second objects 108, and/or one or more gestures within the FOV 130B. The change in position and/or orientation of one or more first objects 103 and/or the one or more gestures may be detected by performing a scanning operation in a same or similar manner as discussed previously with regard to operation 1109. The change in position and/or orientation of the one or more second objects 108 may be detected using object data representative of one or more first objects 103 detected by the computing device 105A. Although not shown by FIG. 11, object data representative of the newly positioned and/or newly oriented first objects 103 detected by computing device 105A (i.e., which may be newly positioned and/or newly oriented second objects 108 according to a perspective of computing device 105B) may be detected in a same or similar manner as discussed previously with regard to operation 1112 and the object data may be obtained in a same or similar manner as discussed previously with regard to 1118. At operation 1148, the computing device 105B may send object data representative of the newly positioned and/or oriented first object 103 as detected by the computing device 105B at operation 1145, and/or the computing device 105B may send data representative of one or more gestures detected by the computing device 105B.

At operation 1151, the computing device 105B may generate an updated overlay image 113 based on the newly positioned and/or newly oriented first objects 103, the newly positioned and/or newly oriented second objects 108, relative distances between the newly positioned and/or newly oriented first objects 103 and other first objects 103 and/or second objects 108, etc. At operation 1154, the computing device 105B may send updated overlay image data to the computing device 105A.

At operation 1157, computing device 105A may generate images associated with second objects 108 using the object data received at operation 1148, and generate an overlay image using the updated overlay image data received at operation 1154.

At operation 1160, the computing device 105B may display and/or project the updated overlay image generated at operation 1151. At operation 1163, the computing device 105A may display and/or project the images generated at operation 1157. A position and/or orientation at which the generated images are displayed/projected within the FOV 130A may be based on position/orientation information included with the object data received at operation 1148 and/or position/orientation information included with the updated overlay image data received at operation 1154.

It should be noted that the various operations shown and described with regard to FIG. 11 may be reordered and/or removed, or additional operations may be added, without departing from the scope of the example embodiments described herein.

Figure 12:
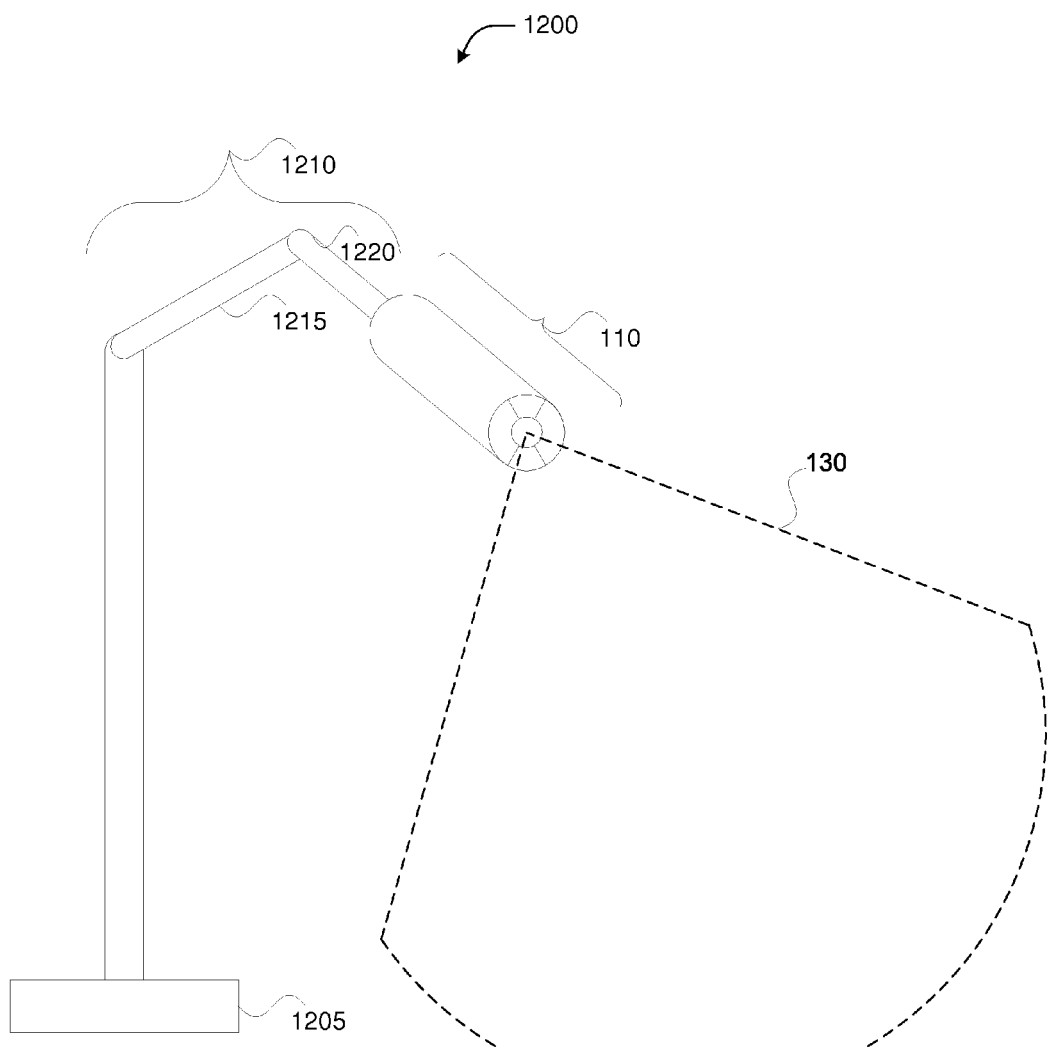
FIG. 12 illustrates a lamp-style stand for a remote play module, in accordance with various example embodiments.

FIG. 12 illustrates the components of a RPM stand 1200, in accordance with various example embodiments. As shown, the RPM stand 1200 includes the RPM 110 having a cylindrical shaped housing, base 1205, and arm 1210. The RPM stand 1200 may be a "lamp-style" stand, which is similar in appearance and function as a desktop lamp, table lamp, balanced-arm lamp, floating arm lamp, and/or any other like lighting fixture that may rest on a platform. The base 1205 may be connected to the lower arm 1215 of the arm 1210, and the lower arm 1215 may be connected to the upper arm 1220. Each of the lower arm 1215 and the upper arm 1220 may be fitted with springs and hinges (not shown). The RPM 110 may be connected to the arm 1210 in a lamp-head position. The lower arm 1215 and/or the upper arm 1220 may be moved into any position and/or orientation, and the springs attached thereto may maintain the position and/or orientation until moved again. In this way, a user of the RPM 110 may orient the FOV 130 to have a desired FOV 130 beam or focus area. The components of the RPM stand 1200 may be connected to each other by screws, nails, bolts, glue, pins, snap-on devices, and/or any other like connector apparatuses and/or adhesives. The RPM stand 1200 may be constructed of one or more materials, such as wood, plastic, metal, particle board, one or more resins, porcelain, ceramic, Polyvinyl chloride (PVC), and the like and/or a combination thereof. The size, shape, and/or color of the various components of the RPM stand 1200 may be chosen according to one or more design choices.

Figure 13:
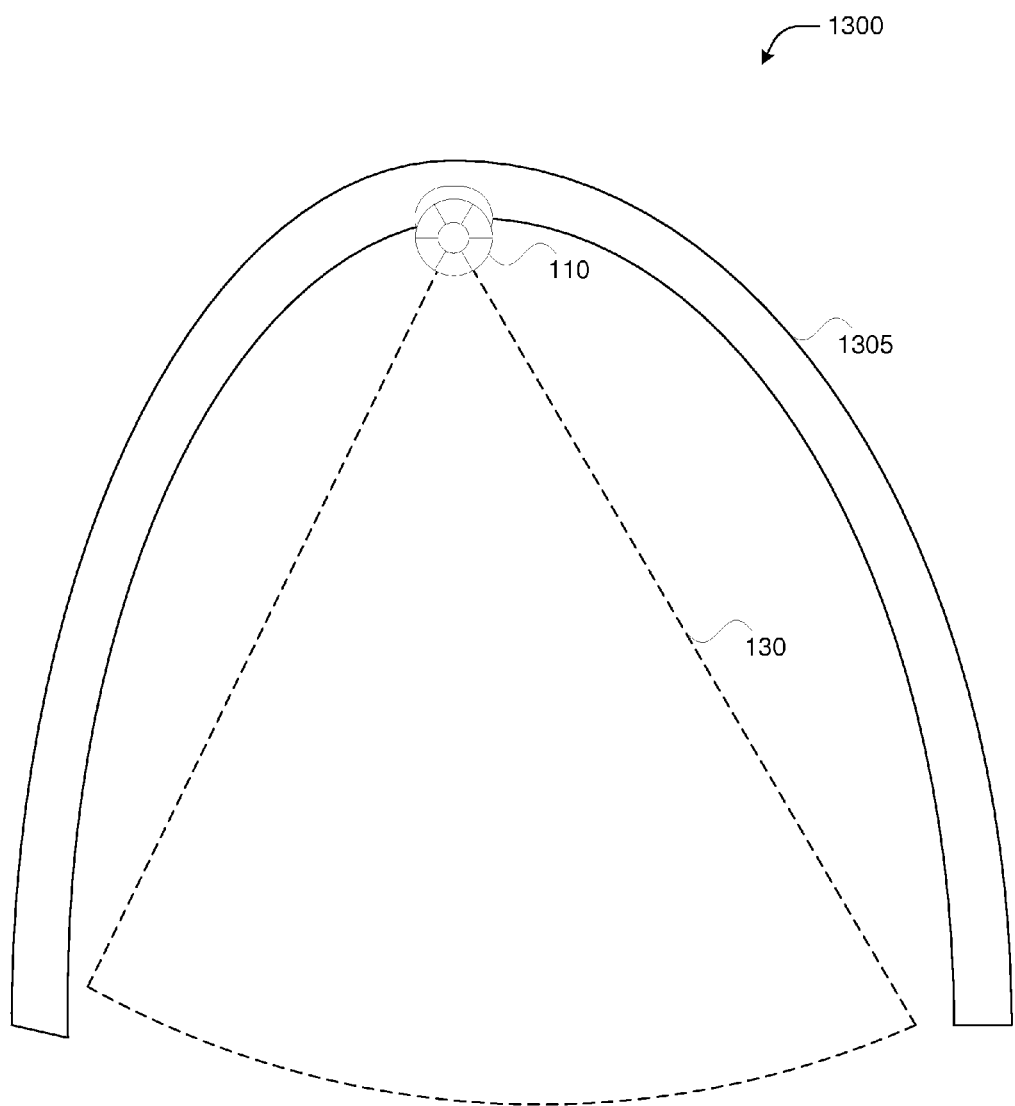
FIG. 13 illustrates an arch-style stand for a remote play module, in accordance with various example embodiments.

FIG. 13 illustrates the components of a RPM stand 1300, in accordance with various example embodiments. As shown, the RPM stand 1300 includes the RPM 110 having a cylindrical shaped housing, and arch 1305. The RPM stand 1300 may be an "arch-style" stand. The RPM 110 may be connected at an apex of the arch 1305 such that the FOV 130 may emanate in a downward fashion from the apex of the arch 1305. The RPM 110 may be connected to the arch 1305 by screws, nails, bolts, glue, pins, snap-on devices, and/or any other like connector apparatuses and/or adhesives. The RPM stand 1300 may be constructed of one or more materials, such as wood, plastic, metal, particle board, one or more resins, porcelain, ceramic, PVC, and the like and/or a combination thereof. The size, shape, and/or color of the various components of the RPM stand 1300 may be chosen according to one or more design choices. In some embodiments, the arch 1305 may include a track comprising rails and/or fasteners (not shown), wherein the RPM 110 may include one or more wheels or other like devices that enable the RPM 110 to travel along the track (not shown). In this way, an angle of the RPM 110 relative to the arch 1305 may be altered thereby altering an angle of the FOV 130 relative to a platform or other like playing surface.

Figure 14:
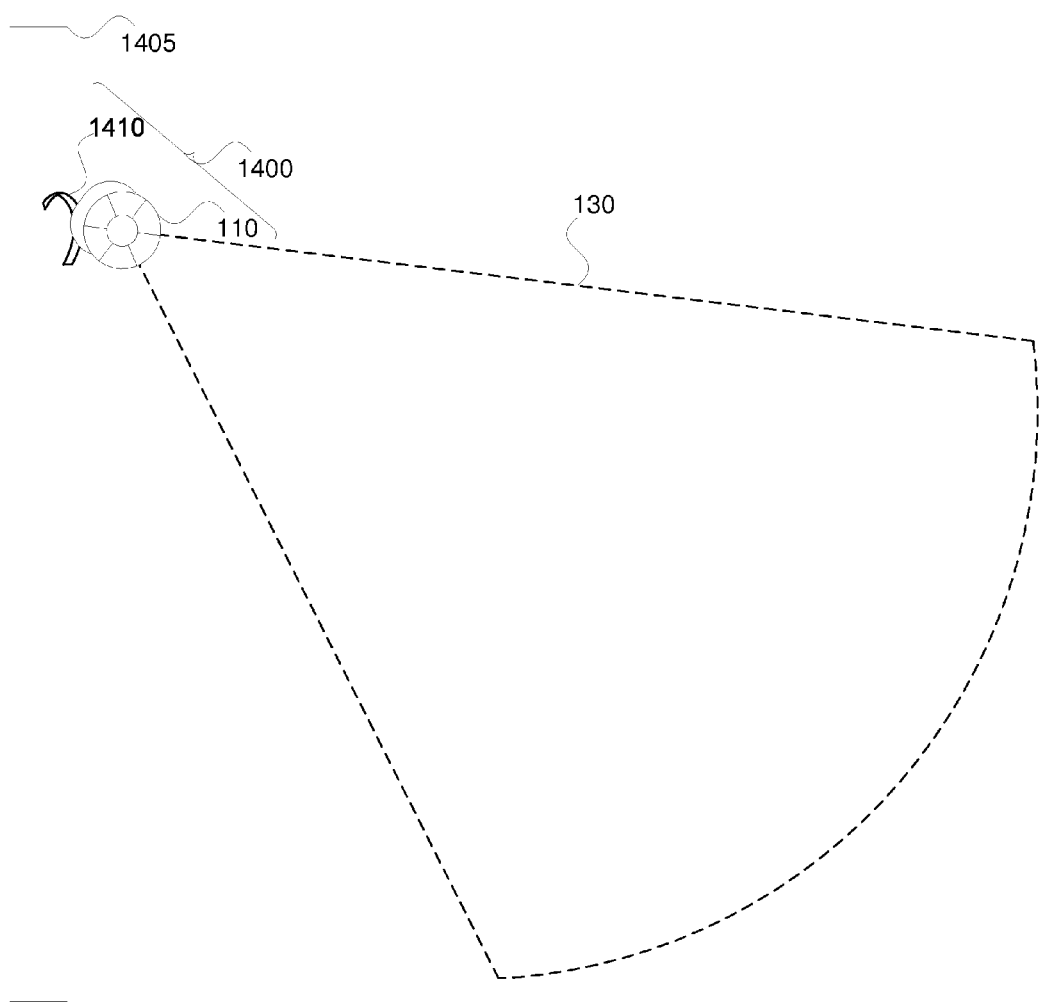
FIG. 14 illustrates a wall-mounted stand for a remote play module, in accordance with various example embodiments.

FIG. 14 illustrates the components of a RPM stand 1400, in accordance with various example embodiments. As shown, the RPM stand 1400 includes the RPM 110 having a cylindrical shaped housing, and connector 1410 that may be configured to attach to wall 1405. The RPM stand 1400 may be a "wall mounted" stand. The RPM 110 may be connected to the connector 1410 such that the FOV 130 may emanate in a downward fashion at a desired angle from the wall 1405. A rotating device may be connected to the RPM 110 and the connector 1410, which may allow the RPM 110 to move with respect to the connector 1410 such that an angle of the RPM 110 with respect to the wall 1405 may be altered without altering a position of the RPM stand 1400 on the wall 1405. The rotating device may be a hinge or other like bearing that provides an angle of rotation between two connected elements. The RPM 110 may be connected to the connector 1410 (and/or the rotating device) by screws, nails, bolts, glue, pins, snap-on devices, and/or any other like connector apparatuses and/or adhesives. The connector 1410 may be any device that may be configured to hold an element in a fixed position, such as hooks, clamps, push-pins, tacks, and/or other like devices for physically attaching and holding an object in a fixed position. In some embodiments, the connector 1410 may be an adhesive that may be configured to hold an dement in a fixed position when applied to the surface of one or more materials by binding the one or more materials together. The RPM stand 1400 may be constructed of one or more materials, such as wood, plastic, metal, particle board, one or more resins, glue, porcelain, ceramic, PVC, and the like and/or a combination thereof. The size, shape, and/or color of the various components of the RPM stand 1400 may be chosen according to one or more design choices.

FIG. 15 illustrates the components of RPM 110, in accordance with various example embodiments. As shown, RPM may include display 1504, battery 1505, sensors 1506, input/output (I/O) interface 1507, processor 1510, bus 1520, I/O bus 1525, communication module 1530, and memory 1550. In some embodiments, RPM 110 may include many more components than those shown in FIG. 15, such as a transmitter/receiver (or alternatively, a transceiver), a mobile video card and/or a graphics processing unit (GPU), and other like components. However, it is not necessary that all of these generally conventional components be shown in order to disclose the example embodiments.

Memory 1550 may be a hardware device configured to store an operating system 360 and program code for one or more software components, such as (optionally) an operating system (not shown), device interface module 1580, rendering module 1575, and/or (optionally) one or more other applications (not shown). Memory 1550 may be a computer readable storage medium that generally includes a random access memory (RAM), read only memory (ROM), a flash memory device, a solid state disk (SSD), a secure digital (SD) card, and/or other like storage media capable of storing and recording data. The program code, modules, and/or software components may also be loaded from a separate computer readable storage medium into memory 1550 using a drive mechanism (not shown). Such separate computer readable storage medium may include a memory card, memory stick, removable flash drive, sim card, and/or other like computer readable storage medium (not shown).

During operation, memory 1550 may include an (optionally) operating system, device interface module 1580, rendering module 1575, and/or (optionally) one or more other applications (not shown). The operating system may manage computer hardware and software resources and provide common services for computer programs. The operating system may include one or more drivers, such as a display drivers, sensor drivers, battery drivers, and/or any other like drivers that provide an interface to hardware devices thereby enabling the device interface module 1580, rendering module 1575, and/or (optionally) one or more other applications (not shown) to access hardware functions without needing to know the details of the hardware itself. The operating system may be a general purpose operating system or an operating system specifically written for and tailored to the RPM 110. In embodiments where the operating system is not present, the device interface module 1580 may provide the interface to the various hardware devices of RPM 110.

Device interface module 1580 may be one or more software modules configured to interact with the various hardware components of the RPM 110 (e.g., display 1504, battery 1505, sensors 1506, and input/output devices via I/O interface 1507, etc.). In various embodiments, the device interface module 1580 may obtain data from the one or more hardware components (e.g., sensor data), and provide the data to the rendering module 1575 and/or other applications (not shown) for processing and/or rendering. In various embodiments, the device interface module 1580 may provide the sensor data to the communication module 1530 to be communicated to another device (e.g., computing device 105) for processing and/or rendering.

The rendering module 1575 may be one or more software applications that operate in conjunction with one or more hardware devices (e.g., one or more GPUs, etc.) to generate one or more images based on the sensor data received from the device interface module 1580, generate one or more images based on object data received from the device interface module 1580 via the communication module 1530, and display the generated images via the display 1504. The rendering module 1575 may generate and display/project images according to known methods.

Processor 1510 may be configured to carry out instructions of a computer program by performing the basic arithmetical, logical, and input/output operations of the system. The processor 1510 may include a single-core processor, a dual-core processor, a triple-core processor, a quad-core processor, one or more digital signal processors (DSPs), application-specific-integrated-circuits, field programmable gate arrays (FPGAs), and/or the like. The processor 1510 may perform a variety of functions for the RPM 110 and may process data by executing program code, one or more software modules, firmware, middleware, microcode, hardware description languages, and/or any other like set of instructions stored in the memory 1550. The program code may be provided to processor 1510 by memory 1550 via bus 1520, one or more drive mechanisms (not shown), and/or via communication module 1530. In order to perform the variety of functions and data processing operations, the program code, modules, and/or software components may be executed by the processor 1510. On execution by the processor 1510, the processor 1510 may cause RPM 110 to perform the various operations and functions delineated by the program code, modules, and/or software components.

For example, in various embodiments, the RPM 110 may include various modules configured to operate (through hardware and/or software) to obtain, from the sensors 1506, sensor data that is indicative of one or more first objects 103 and/or one or more gestures performed by a user of the RPM 110; generate or otherwise determine position data, orientation data, shape data, color data, printed data, etc. of the one or more first objects 103 based on the sensor data as described herein; and control the communication module 1530 to communication information indicative of the one or more first objects 103 as described herein. The one or more modules may include the rendering module 1575 and the device interface module 1580. The various modules may be loaded into the memory 1550 and executed by the processor 1510. Once the various modules are loaded into memory 1550 and executed by the processor 1510, the processor 1510 may be configured to cause RPM 110 to control the sensors 1506 to perform the various functions and/or operations of the example embodiments described herein. In various embodiments, converting the sensor data into a information indicative of the first objects 103 may include converting one or more spatial coordinates (or spatial coordinate changes), color data, shape data, printed information, etc. of the first objects 103 into a markup language, a hypertext language, a text file, firmware, middleware, microcode, hardware description language, or any combination thereof that may be executed or otherwise interpreted by the processor 1510 or the processor 1610 of the computing device 105 (see e.g., description of FIG. 16). While specific modules are described herein, it should be recognized that, in various embodiments, various modules may be combined, separated into separate modules, and/or omitted.

Bus 1520 may be configured to enable the communication and data transfer between the processor 1510 and memory 1550. Bus 1520 may comprise a high-speed serial bus, parallel bus, internal universal serial bus (USB), Front-Side-Bus (FSB), and/or other suitable communication technology for transferring data between components within RPM 110. I/O bus 1525 may be configured to enable the communication and data transfer between the components of RPM 110 with display 1504, battery 1505, sensors 1506, and/or one or more peripheral devices via the I/O interface 1507. In various embodiments, the I/O bus 1525 may be the same or similar as bus 1520, while in some embodiments, I/O bus 1525 may comprise a PCI bus, a PCI-Express (PCI-e) bus, a Small Computer System Interface (SCSI) bus, and the like.

Communication module 1530 may be a computer hardware component that connects RPM 110 to a computing device 105 via a direct D2D wireless connection and/or via a computer network (e.g., network 115). Communication module 1530 may connect with one or more devices via the direct wireless connection by using, for example, Bluetooth and/or BLE protocols, WiFi protocols, IrDA protocols, ANT and/or ANT+ protocols, LTE ProSe, and the like in a same or similar manner as discussed previously. In some embodiments, communication module 1530 may connect the RPM 110 with one or more devices via network 115 in accordance with one or more wireless communications protocols and/or one or more cellular phone communications protocols. In such embodiments, communication module 1530 may be configured to operate in accordance with the GSM, EDGE, WCDMA, CDMA, TDMA, Bluetooth and/or BLE, Wi-Fi such as IEEE 802.11a, IEEE 802.11b, IEEE 802.11g, IEEE 802.11ac, and/or IEEE 802.11n, VoIP, Wi-MAX, LTE, and/or any other "wireless" communication protocols. Communication module 1530 may operate in conjunction with a wireless transmitter/receiver and/or transceiver (not shown) that is configured to operate in accordance with one or more wireless standards described above. The communication module 1530 may also include one or more network interfaces, one or more virtual network interfaces configured to operate with device interface module 1580 and/or other like modules or applications.

RPM 110 may also include a transmitter and receiver or a transceiver (not shown), which may be included with, or operated in conjunction with the communication module 1530. The transmitter may be any type of hardware device that generates or otherwise produces radio waves in order to communicate with one or more other devices. The transmitter may be coupled with an antenna (not shown) in order to transmit data to one or more other devices. The transmitter may be configured to receive digital data from one or more components of RPM 110 via bus 1520 and/or I/O bus 1525, and convert the received digital data into an analog signal for transmission over an air interface. The receiver may be any type of hardware device that can receive and convert a signal from a modulated radio wave into usable information, such as digital data. The receiver may be coupled with the antenna (not shown) in order to capture radio waves. The receiver may be configured to send digital data converted from a captured radio wave to one or more other components of mobile terminal 105 via bus 1520. In embodiments where a transceiver (not shown) is included with computing devices 105, the transceiver may be a single component configured to provide the functionality of a transmitter and a receiver as discussed above.

Display 1504 may be physical hardware devices configured to provide information in a visual medium. In various embodiments, the display 1504 may include a display device and/or a projector as described previously and a display module that may obtain one or more image signals from the processor 1510 and/or one or more GPUs (not shown), and provide the one or more image signals to the display device and/or projector for display. The device module technologies, display device technologies and/or projector device technologies are generally well known, and a description of the functionality of the display module, display device, and projector devices is omitted for brevity.

I/O interface 1507 may be a computer hardware component that provides communication between the RPM 110 and one or more other devices. The I/O interface 1507 may include one or more user interfaces designed to enable user interaction with the RPM 110 and/or peripheral component interfaces designed to provide interaction between the RPM 110 and one or more peripheral components. User interfaces may include, but are not limited to a physical keyboard or keypad, a touchpad, audio devices, microphones, etc. Peripheral component interfaces may include, but are not limited to, a non-volatile memory port, a universal serial bus (USB) port, an audio jack, and a power supply interface. It should be noted that the I/O interface 1507 may be an optional element, and thus, in some embodiments the I/O interface 1507 may be omitted from the RPM 110.

Sensors 1506 may include one or more sensing devices to determine position information (or alternatively "position data"), orientation information (or alternatively "orientation data"), shape data, color data, printed information, and/or like information related to one or more first objects 103 within an FOV 130. In some embodiments, the sensors 1506 may include, but are not limited to, one or more image detection devices, an accelerometer, gyroscope, gravimeter, magnetometer, proximity sensor, ambient light sensor, and the like. In some embodiments, the sensors 1506 may include a positioning unit, such as global positioning system (GPS) circuitry, and the like.

Battery 1505 may be a device configured to provide electrical power to the RPM 110 using one or more electrochemical cells including nickel-cadmium (NiCd), nickel-zinc (NiZn), nickel metal hydride (NiMH), and lithium-ion (Li-ion) cells. In some embodiments battery 1505 may comprise a supercapacitor device and/or an ultracapacitor device, while in other embodiments, the battery 1505 may comprise a fuel cell device. The battery 1505 may communicate battery information to the device interface module 1580 when queried by the device interface module 1580. The battery information may indicate whether the RPM 110 is connected to a power source, whether the connected power sources is wired or wireless, whether the connected power sources is an alternating current charger or a USB charger, a current voltage of the battery, a remaining battery capacity as an integer percentage of total capacity (with or without a fractional part), a battery capacity in microampere-hours, an average battery current in microamperes, an instantaneous battery current in microamperes, a remaining energy in nanowatt-hours, whether the battery is overheated, cold, dead, or has an unspecified failure, and the like. The device interface module 1580 may provide the battery information to the processor 1510 and/or the communication module 1530 to provide the battery information to the computing device 105.

FIG. 16 illustrates the components of the computing devices 105, in accordance with various example embodiments. As shown, computing devices 105 may include processor 1610, bus 1620, I/O bus 1625, communication module 1630, input/output (I/O) interface 1640, and memory 1650. In some embodiments, computing devices 105 may include many more components than those shown in FIG. 16, such as input devices (e.g., a physical keyboard, a touchscreen, etc.), a transmitter/receiver (or alternatively, a transceiver), a mobile video card and/or graphics processing unit (GPU), and other like components. However, it is not necessary that all of these generally conventional components be shown in order to disclose the example embodiments. Furthermore, it should be noted that the components shown by FIG. 16 may be included in the RPM 110 in embodiments where the computing device 105 is not used in a remote gaming environment, such as the remote gaming environments 500 and 1000 shown by FIGS. 5 and 10, respectively.

Memory 1650 may be a hardware device configured to store an operating system 1660 and program code for one or more software components, such as a coordination module 1665, an image generation module 1670, a rendering module 1675, a device interface module 1680, and/or one or more applications (not shown). Memory 1650 may be a computer readable storage medium that generally includes a random access memory (RAM), read only memory (ROM), a flash memory device, a solid state disk (SSD), a secure digital (SD) card, and/or other like storage media capable of storing and recording data. The program code and/or software components may also be loaded from a separate computer readable storage medium into memory 1650 using a drive mechanism (not shown). Such separate computer readable storage medium may include a memory card, memory stick, removable flash drive, sim card, and/or other like computer readable storage medium (not shown). In some embodiments, software components may be loaded into memory 1650 via communication module 1630, rather than via a computer readable storage medium.

During operation, memory 1650 may include operating system 1660, coordination module 1665, image generation module 1670, rendering module 1675, and device interface module 1680. Operating system 1660 may manage computer hardware and software resources and provide common services for computer programs. Operating system 1660 may include one or more drivers, such as a display driver, camera and/or image sensor driver, audio drivers, and/or any other like drivers that provide an interface to hardware devices thereby enabling operating system 1660, coordination module 1665, image generation module 1670, rendering module 1675, and device interface module 1680 to access hardware functions without needing to know the details of the hardware itself. The operating system 1660 may be a general purpose operating system or an operating system specifically written for and tailored to the computing device 105.

The coordination module 1665 may be a collection of software modules and/or program code that enables the computing devices 105 to receive sensor data representative of one or more first objects 103 detected by sensors 1606; receive object data representative of one or more second objects 108 from the communication module 1630; determine a position, orientation, shape, color, size, printed information, etc. of the one or more first objects 103 using the sensor data; determine, using the sensor data, whether a new first object 103 has been placed within the FOV 130, and instruct the sensors 1606 to zoom in on the new first object 103 for a desired period of time; determine an object type of the new first object 103; generate a counter indicative of a virtual point property value; generate a timer indicative of an amount of time of a player's turn; receive the sensor data representative of one or more performed gestures, determine a position and/or orientation of the gesture relative to a position of an overlay image 113 using the sensor data that is representative of the gesture, determine whether the gesture was performed proximate to the overlay image 113, determine a gesture type of the performed gesture, and increment or decrement the counter according to the gesture type and/or when the gesture is determined to be performed proximate to the overlay image 113; determine an object type of one or more detected first objects 103 and/or an object type of one or more second objects 108 based on received object data; instruct the rendering module 1675 to display/project an overlay image 113 on top of one or more first objects 103 and/or one or more second objects 108 when the coordination module 1665 determines that one or more gestures have been performed proximate to the one or more first objects 103 and/or the one or more second object 108; determine a position and/or orientation of one or more first objects 103 relative to one or more other first objects 103 and/or relative to one or more second objects 108, and instruct the rendering module 1675 to project/display an overlay image 113 proximate to one or more first objects 103 and/or one or more second objects 108 when the position and/or orientation of the one or more first objects 103 is within a desired distance (or otherwise proximate to) of the other ones of the one or more first object 103 and/or the one or more second objects 108; determine a change in position and/or orientation of one or more first objects 103 and/or one or more second objects 108, and instruct the rendering module to display/project an overlay image 113 according to the change in position and/or orientation, such as when a first object 103 is moved to be more proximate to another first object 103 and/or a second object 108, etc.; and/or other like functions as described herein. Coordination module 1665 may be a native application, a web application, or a hybrid application. In embodiments where the coordination module 1665 is a web or hybrid application, coordination module 1665 may be rendered in or otherwise executed using a web browser of the computing device 105. In various embodiments, a game operator and/or a content provider may develop one or more other applications to interact with the coordination module 1665, such as to provide one or more overlay images 113 to be displayed/projected as described previously.

The image generation module 1670 may be may be a collection of software modules and/or program code that operates in conjunction with one or more hardware devices (e.g., the processor 1610, one or more GPUs, etc.) to generate an image associated with the one or more second objects 108 based on received object data, and generate one or more overlay images as discussed previously. The images for each second object 108 may be generated by the image generation module according to one or more known methods for generating computer graphics. For instance, the images associated with second objects 108 may be a 2D pixel graphic generated using a raster imaging application, a sprite graphic generated using a CSS, a vector graphic generated according to the scalable vector graphics (SVG) standard, a 3D graphic generated using one or more known 3D modeling applications, etc. The images associated with the second objects 108 may generate images from a 2D or 3D model according to one or more known methods, such as by obtaining object data and/or image data from one or more data packets, processing the object data and/or image data into a scene file taking into account geometry information, viewpoint information, texture information, lighting information, shading information, and/or the like, and outputting the processed data to a digital image file, a raster image file, and the like. The rendering module 1675 may operate in conjunction with the image generation module to display/project the generated images according to one or more known video mapping or projection mapping methods, one or more known projection methods, and/or any other like known method for displaying/projecting images. The hardware devices used by the image generation module 1670 and the rendering module 1675 may include one or more GPUs and/or any other like hardware device that is configured to perform complex image generation and/or rendering calculations. In various embodiments, the image generation module 1670 may be included with the rendering module 1675, while in some embodiments, the operations and/or functions of the image generation module 1670 may be performed by the rendering module 1675.

Device interface module 1680 may be one or more software modules configured to interact with the various hardware components of the computing device 105 (e.g., display 1604, battery 1605, sensors 1606, and one or more input/output devices via I/O interface 1607, etc.). In various embodiments, the device interface module 1680 may obtain data from the one or more hardware components (e.g., sensor data), and provide the sensor data to the coordination module 1665 and/or other applications (not shown) for processing. In various embodiments, the device interface module 1680 may obtain object data via the communication module 1630, and transmit or otherwise issue the instructions the various output devices, such as the display 1604, one or more devices communicatively connected via the I/O interface, one or more audio/display devices communicatively connected via the communication module 330, etc.

Processor 1610 may be configured to carry out instructions of a computer program by performing the basic arithmetical, logical, and input/output operations of the system. The processor 1610 may include a single-core processor, a dual-core processor, a triple-core processor, a quad-core processor, and/or the like. The processor 1610 may perform a variety of functions for the computing devices 105 and may process data by executing program code, one or more software modules, firmware, middleware, microcode, hardware description languages, and/or any other like set of instructions stored in the memory 1650. The program code may be provided to processor 1610 by memory 1650 via bus 1620, one or more drive mechanisms (not shown), and/or via communication module 1630. In order to perform the variety of functions and data processing operations, the program code and/or software components may be executed by the processor 1610. On execution by the processor 1610, the processor 1610 may cause computing devices 105 to perform the various operations and functions delineated by the program code, modules, and/or software components according to the example embodiments disclosed herein. For example, in various embodiments, the computing devices 105 may include various modules configured to operate (through hardware and/or software) as discussed previously. The various modules may be loaded into memory 1650 and executed by the processor 1610. Once the various modules are loaded into memory 1650 and executed by the processor 1610, the processor 1610 may be configured to perform the operations and/or functions delineated by the modules as discussed previously. While specific modules are described herein, it should be recognized that, in various embodiments, various modules and/or processes may be combined, separated into separate modules and/or processes, and/or omitted. Additionally, in various embodiments, one or more modules and/or processes may be implemented on separate devices, in separate locations, or distributed, individually or in sets, across multiple processors, devices, locations, and/or in cloud-computing implementations.

Bus 1620 may be configured to enable the communication and data transfer between the components of computing device 105. Bus 1620 may comprise a high-speed serial bus, parallel bus, internal universal serial bus (USB), Front-Side-Bus (FSB), and/or other suitable communication technology for transferring data between components within computing device 105 and/or between computing device 105 and other like devices. I/O bus 1625 may be configured to enable the communication and data transfer between the components of RPM 110 with display 1604, battery 1605, sensors 1606, and/or one or more peripheral devices via the I/O interface 1607. In various embodiments, the I/O bus 1625 may be the same or similar as bus 1620, while in some embodiments, I/O bus 1625 may comprise a PCI bus, a PCI-Express (PCI-e) bus, a Small Computer System Interface (SCSI) bus, and the like.

Communication module 1630 may be a computer hardware component that connects RPM 110 to a computing device 105 via a direct D2D wireless connection and/or via a computer network (e.g., network 115). Communication module 1630 may connect with one or more devices via the direct wireless connection by using, for example, Bluetooth and/or BLE protocols, WiFi protocols, IrDA protocols, ANT and/or ANT+ protocols, LTE ProSe, and the like in a same or similar manner as discussed previously. In some embodiments, communication module 1630 may connect the computing device 105 with one or more devices via network 115 in accordance with one or more wireless communications protocols and/or one or more cellular phone communications protocols. In such embodiments, communication module 1630 may be configured to operate in accordance with the GSM, EDGE, WCDMA, CDMA, TDMA, Bluetooth, Wi-Fi such as IEEE 802.11a, IEEE 802.11b, IEEE 802.11g, IEEE 802.11ac, and/or IEEE 802.11n, VoIP, Wi-MAX, LTE, and/or any other "wireless" communication protocols. Communication module 1630 may operate in conjunction with a wireless transmitter/receiver and/or transceiver (not shown) that is configured to operate in accordance with one or more wireless standards described above. The communication module 1630 may also include one or more network interfaces, one or more virtual network interfaces configured to operate with device interface module 1680 and/or other like modules or applications.

The computing devices 105 may also include a transmitter and receiver or a transceiver (not shown), which may be included with, or operated in conjunction with the communication module 1630. The transmitter may be any type of hardware device that generates or otherwise produces radio waves in order to communicate with one or more other devices. The transmitter may be coupled with an antenna (not shown) in order to transmit data to one or more other devices. The transmitter may be configured to receive digital data from one or more components of computing devices 105 via bus 1620 and/or I/O bus 1625, and convert the received digital data into an analog signal for transmission over an air interface. The receiver may be any type of hardware device that can receive and convert a signal from a modulated radio wave into usable information, such as digital data. The receiver may be coupled with the antenna (not shown) in order to capture radio waves. The receiver may be configured to send digital data converted from a captured radio wave to one or more other components of mobile terminal 105 via bus 1620. In embodiments where a transceiver (not shown) is included with computing devices 105, the transceiver may be a single component configured to provide the functionality of a transmitter and a receiver as discussed above.

I/O interface 1607 may be a computer hardware component that provides communication between the RPM 110 and one or more other devices. The I/O interface 1607 may include one or more user interfaces designed to enable user interaction with the RPM 110 and/or peripheral component interfaces designed to provide interaction between the RPM 110 and one or more peripheral components. User interfaces may include, but are not limited to a physical keyboard or keypad, a touchpad, audio devices, microphones, etc. Peripheral component interfaces may include, but are not limited to, a non-volatile memory port, a USB port, an audio jack, and a power supply interface.

Sensors 1606 may include one or more sensing devices to determine position information (or alternatively "position data"), orientation information (or alternatively "orientation data"), shape data, color data, printed information, and/or like information related to one or more first objects 103 within an FOV 130. In some embodiments, the sensors 1606 may include, but are not limited to, one or more image detection devices, an accelerometer, gyroscope, gravimeter, magnetometer, proximity sensor, ambient light sensor, and a positioning unit, such as GPS circuitry, and the like.

Battery 1605 may be a device configured to provide electrical power to the RPM 110 using one or more electrochemical cells including NiCd, NiZn, NiMH, and Li-ion cells. In some embodiments battery 1605 may comprise a supercapacitor device and/or an ultracapacitor device, while in other embodiments, the battery 1605 may comprise a fuel cell device. The battery 1605 may communicate battery information to the device interface module 1680 when queried by the device interface module 1680. The battery information may indicate whether the computing device 105 is connected to a power source, whether the connected power sources is wired or wireless, whether the connected power sources is an alternating current charger or a USB charger, a current voltage of the battery, a remaining battery capacity as an integer percentage of total capacity (with or without a fractional part), a battery capacity in microampere-hours, an average battery current in microamperes, an instantaneous battery current in microamperes, a remaining energy in nanowatt-hours, whether the battery is overheated, cold, dead, or has an unspecified failure, and the like. The device interface module 1680 may provide the battery information to the processor 1610 and/or the communication module 1630 to provide the battery information to the computing device 105.

Figure 17:
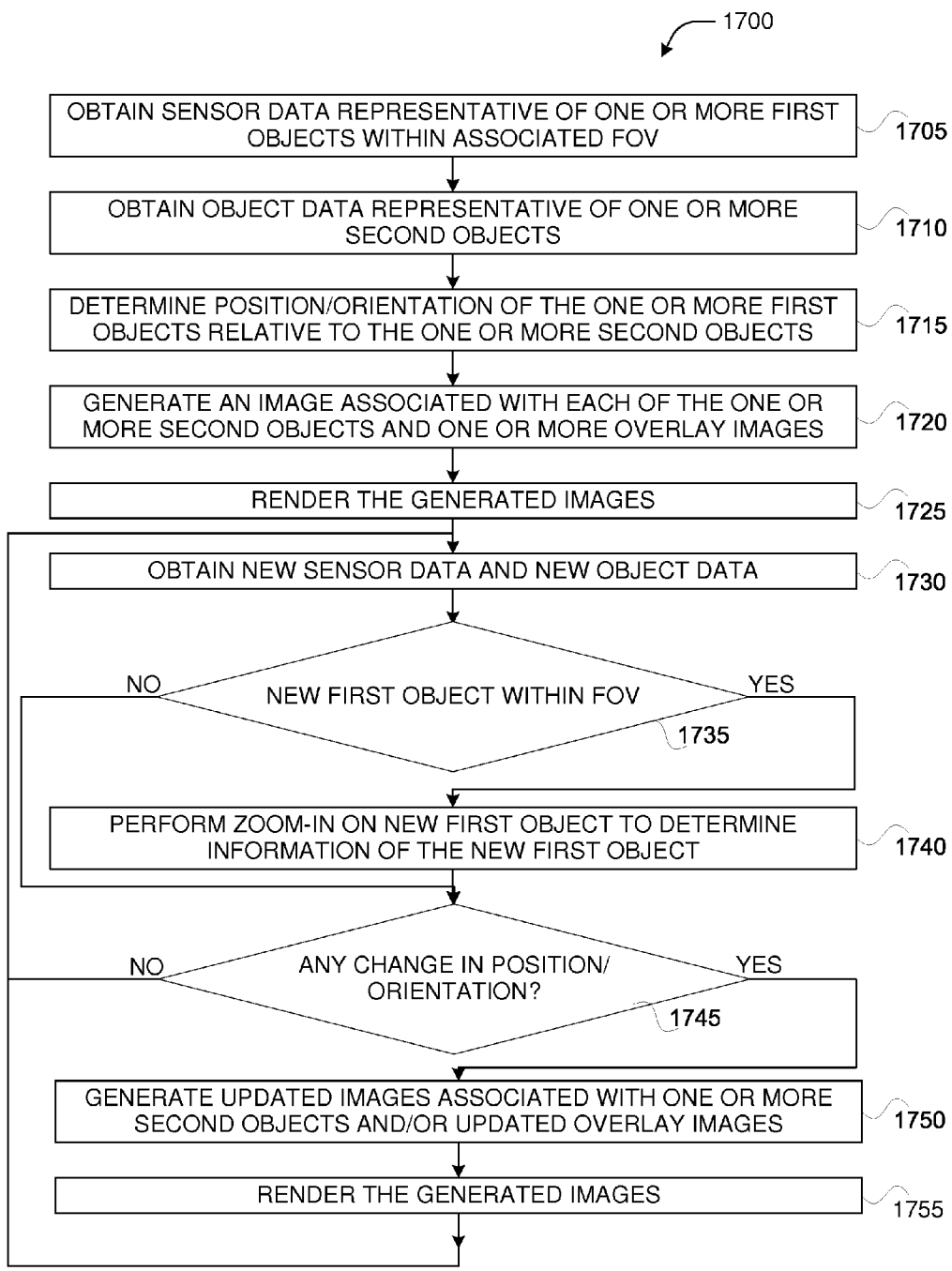
FIG. 17 illustrates a process for providing remote co-play, in accordance with various embodiments.

FIG. 17 illustrates a process 1700 for providing remote co-play, in accordance with various embodiments. In various embodiments, the process 1700 may be implemented as application that may be executed by a processor of computing device 105 and/or RPM 110 (e.g., processor 1510 discussed with regard to FIG. 15 or processor 1610 discussed with regard to FIG. 16). For illustrative purposes, the operations of process 1700 will be described as being performed by the various modules of the computing device 105 (e.g., the example embodiments shown and discussed with regard to FIGS. 1-4 and 6-9); however, it should be noted that in embodiments where the computing device 105 is not used, various modules of the RPM 110 may operate the process 1700 (e.g., the example embodiments shown and discussed with regard to FIGS. 5 and 10). Furthermore, it should be noted that other similar devices may operate the process 1700 as described below. While particular examples and orders of operations are illustrated in FIG. 17, in various embodiments, these operations may be re-ordered, broken into additional operations, combined, and/or omitted altogether.

Referring to FIG. 17, at operation 1705, the coordination module 1665 may obtain sensor data representative of one or more first objects 103. The coordination module 1665 may obtain the sensor data from sensors 1606 via the device interface module 1680. In various embodiments, the coordination module 1665 may obtain the sensor data from the communication module 1630, which may obtain one or more data packets from the communication module 1530 wherein the one or more data packets encapsulate the sensor data obtained from sensors 1506 of the RPM 110.

At operation 1710, the coordination module 1630 may obtain object data representative of one or more second objects 108 (i.e., first objects 103 detected by another computing device 105). In various embodiments, the coordination module 1665 may obtain the object data from the communication module 1630, which may obtain one or more data packets encapsulating the object data obtained from another computing device 105 and/or another RPM 110. The object data may include position data, orientation data, shape data, size data, color data, printed information data, and/or any other like information associated with one or more second objects 108. The position information and/or orientation information may be in the form of spatial coordinates (e.g., (x, y, z) coordinates, etc.) within a coordinate system defined for the FOV 130.

At operation 1715, the coordination module 1665 may determine a position and/or an orientation of the one or more first objects 103 using the obtained sensor data, and determine a position and/or orientation of the one or more first objects relative to the one or more second objects 108 using the determined position and/or orientation and the position information and/or orientation information contained in the obtained object data. To determine the position/orientation of each first object 103 within the FOV 130, the sensors 1606/1506 may be used in combination with known vision recognition algorithms, which may determine a relative distance of each first object 103 to a known position within the FOV 130. In some embodiments, Real-Sense Technology® developed by Intel® may be employed to further enhance position and/or orientation determination. To determine the position/orientations relative to other positions/orientations, the coordination module 1665 may compare the determined position/orientation of each first object 103 with the position/orientation of each other one of the first objects 103, and with the position information and/or orientation information of each second object 108. The comparison may be used to determine a distance d between each of the first objects 103 and each of the second objects 108.

At operation 1720, the coordination module 1665 may instruct the image generation module 1670 and/or the rendering module 1675 to generate an image for each of the second objects 108, and generate one or more overlay images 113 based on the determined position and/or orientation of the one or more first objects 103 relative to the one or more second objects 108, as determined at operation

1715. The specific overlay images 113 to be generated may be based on various game play criteria and/or design choices.

At operation 1725, the rendering module 1675 may display/project the generated images associated with each second object 108 and the generated overlay images 113. In various embodiments, the generated images may be provided to an associated RPM 110 via communication module 1630 for rendering, such as the computing device 105A providing image data to be projected by RPM 110A as shown by FIGS. 3 and 8. In such embodiments, communication module 1575 may receive the image data in the form of one or more data packets, and provide the image data to the rendering module 1575 to be projected according to one or more known projection methods. Furthermore, in various embodiments, the rendering of the generated images may include providing an audio output, such as a sound effect, to an embedded audio output device or an external audio output device as described previously.

At operation 1730, the coordination module 1665 obtains new sensor data and new object data, which may be obtained in a same or similar manner as discussed previously with regard to operation 1705. It should be noted that the new sensor data may include sensor data indicative of one or more gestures performed by a user of the computing device 105. The one or more gestures may include one or more bodily movements, one or more voice commands, and the like.

At operation 1735, the coordination module 1665 determines whether a new first object 103 has been placed within the FOV 130. If the coordination module 1665 determines that a new first object 103 has not been placed within the FOV 130, the computing device 105 proceeds to operation 1745 to determine whether any changes in position/orientation of the one or more first objects 103 and/or the one or more second objects 108 has taken place. If the coordination module 1665 determines that a new first object 103 has been placed within the FOV 130, the computing device 105 proceeds to operation 1740 to perform a zoom-in on the new first object 103.

At operation 1740, the coordination module 1665 may perform a zoom-in on the new first object 103 in order to determine information associated with the new first object 103. The information associated with the new first object 103 may include shape data, color data, size data, information printed on the new first object 103 (e.g., information printed on a playing card), and the like. The zoom-in operation may include any method of changing or altering an apparent angle of view of an image or video. In various embodiments, the coordination module 1665 may instruct the sensors 1606 to perform a mechanical zoom, wherein a lens on a camera or other like image sensor is physically adjusted in order to zoom in on the new first object 103. In other embodiments, the coordination module 1665 may instruct the image generation module 1670 and/or the rendering module 1670 to perform a digital zoom operation, wherein a digital image is taken of the new first object 103, digitally cropping the digital image to a desired center area with a same aspect ratio of the original digital image, and optionally interpolating the cropped image to the pixel dimensions of the original digital image. The aforementioned zoom-in operations are generally well know, and further description of the aforementioned zoom-in operations is omitted for brevity.

At operation 1745, the coordination module 1665 may determine a change in the position and/or orientation of the first objects 103 using the new sensor data and/or the second objects 108 using the new object data. If the coordination module 1665 determines that a change in position and/or orientation of the first objects 103 and/or the second objects 108 has not occurred, the computing device 105 proceeds back to operation 1730 to obtain new sensor data and/or new object data. If the coordination module 1665 determines that a change in position and/or orientation of the first objects 103 and/or the second objects 108 has occurred, the computing device 105 proceeds to operation 1750 to generate updated images associated with the changed position/orientation of the second objects and/or to generate an updated overlay image 113 based on the changed positions/orientations.

At operation 1750, the image generation module 1670 and/or the rendering module 1675 may generate updated images associated with the changed position/orientation of the second objects and/or to generate an updated overlay image 113 based on the changed positions/orientations. In various embodiments, the updated overlay images 113 and/or the updated images associated with the one or more second objects 108 may be based on various game play criteria. For example, the updated overlay images 113 may be generated based on whether a first object 103 is within a predefined distance d of a second object 108. In some embodiments, the updated overlay images 113 and/or the updated images associated with the one or more second objects 108 may be based on one or more gestures performed by the user of the computing device 105. For example, the updated overlay image 113 may be indicative of a counter value when a user of the computing device 105 performs a gesture to increment/decrement the counter. At operation 1755, the rendering module 1675/1575 may render the updated images associated with the second objects 108 and/or the updated overlay images 113 in a same or similar fashion as described with regard to operation 1725. Once the generated images are rendered, the computing device 105 may proceed back to operation 1730 to obtain new sensor data and/or new object data.

As described herein, the example embodiments provide apparatuses, systems, and methods for emulating interactive gaming experiences. Example embodiments provide that various devices that may utilize already existing playing card games and/or analog toys. Thus, the described embodiments are not tied to a specific proprietary platform and/or specific virtual environments requiring specific virtual property.

Some non-limiting Examples are provided below.

Example 1 may include an apparatus to provide an in-real-life (IRL) interactive experience. The apparatus may comprise one or more sensors to detect a first object in a field of view, FOV, and generate sensor data representative of the first object; a communication module, communicatively coupled with at least one processor, to obtain object data representative of a second object detected by another apparatus and a position of the second object; a coordination module to operate on the at least one processor to receive the sensor data and the object data, and determine a position of the first object using the sensor data; an image generation module to operate on the at least one processor, to generate an image of the second object based on the object data, and generate an overlay image based on the first object or the second object; and a rendering module, communicatively coupled with the at least one processor, to display the generated image at a position within the FOV based on the position of the second object, and display the overlay image within the FOV.

Example 2 may include the apparatus of the preceding example, and/or any other example disclosed herein, wherein the image generation module is to generate the overlay image based on a distance between the position of the first object and the position of the second object.

Example 3 may include the apparatus of any of the preceding examples, and/or any other example disclosed herein, wherein the coordination module is further to determine an orientation of the first object using the sensor data, the object data is further representative of an orientation of the second object, and the image generation module is to generate the overlay image based on the position and the orientation of the first object relative to the position and the orientation of the second object.

Example 4 may include the apparatus of any of the preceding examples, and/or any other example disclosed herein, wherein the coordination module is to determine, using the sensor data, whether a new object has been placed within the FOV, and instruct the one or more sensors to zoom in on the new object for a desired period of time.

Example 5 may include the apparatus of any of the preceding examples, and/or any other example disclosed herein, wherein during the desired period of time, the one or more sensors are to detect at least one of information printed on the new object or a shape of the new object, the coordination module is to determine an object type of the new object, and the image generation module is to generate the overlay image based on the object type of the new object.

Example 6 may include the apparatus of any of the preceding examples, and/or any other example disclosed herein, wherein the overlay image is displayed on top of the first object, on top of the second object, or in an unoccupied area of the FOV.

Example 7 may include the apparatus of any of the preceding examples, and/or any other example disclosed herein, wherein the coordination module is to generate a counter, and the overlay image is an image indicative of a value of the counter; the one or more sensors are to detect a gesture performed by a user of the apparatus, and generate sensor data representative of the gesture; and the coordination module is further to receive the sensor data representative of the gesture, determine a position of the gesture relative to a position of the overlay image using the sensor data that is representative of the gesture, determine whether the gesture was performed proximate to the overlay image, and increment or decrement the counter when the gesture is determined to be performed proximate to the overlay image.

Example 8 may include the apparatus of any of the preceding examples, and/or any other example disclosed herein, wherein the coordination module is to instruct the rendering module to display the overlay image on top of the new object, when the counter value is representative of a virtual property value associated with the first object; and the coordination module is to instruct the rendering module to display the overlay image in an unoccupied area of the FOV, when the counter value is representative of a virtual property value associated with the user of the apparatus.

Example 9 may include the apparatus of any of the preceding examples, and/or any other example disclosed herein, wherein the coordination module is to determine an object type of the first object using the sensor data; the one or more sensors are to detect a gesture performed by a user of the apparatus, and generate sensor data representative of the gesture; and the coordination module is further to receive the sensor data representative of the gesture, determine a position of the gesture relative to the first object using the sensor data that is representative of the gesture, determine whether the gesture was performed proximate to the first object, and instruct the rendering module to display the overlay image over the first object when the gesture is determined to be performed proximate to the first object, wherein the overlay image to be displayed over the first objects is based on the object type of the first object.

Example 10 may include the apparatus of any of the preceding examples, and/or any other example disclosed herein, wherein the coordination module is further to determine an object type of the second object using the object data, determine whether the gesture was performed proximate to a position of the displayed image of the second object, and instruct the rendering module to display the overlay image over the displayed image of the second object when the gesture is determined to be performed proximate to the position of the displayed image of the second object wherein the overlay image to be displayed over the second object is based on the object type of the second object.

Example 11 may include the apparatus of any of the preceding examples, and/or any other example disclosed herein, wherein the coordination module is to determine an object type of first object using the sensor data, determine an object type of the second object using the object data, determine, using the sensor data and the object data, whether a position of the first object is proximate to a position of the second object, and instruct the rendering module to display the overlay image over the first object or the second object when the position of the second object is determined to be proximate to the first object wherein the overlay image to be displayed over the first object is based on the object type of the first object or the overlay image to be displayed over the one of the second objects is based on the object type of the second object.

Example 12 may include the apparatus of any of the preceding examples, and/or any other example disclosed herein, wherein the coordination module is to determine a change in position of the first object, determine a change in position of the second object, instruct the rendering module to display the overlay image over the first object when the change in position of the first object indicates that the first object was moved to be proximate to the second object, and instruct the rendering module to display the overlay image over the second object when the change in position of the second object indicates that the second object was moved to be proximate to the first object.

Example 13 may include the apparatus of any of the preceding examples, and/or any other example disclosed herein, wherein the communication module is to transmit the sensor data to the other apparatus, wherein the other apparatus is to generate and display an image associated with each of the first object.

Example 14 may include the apparatus of any of the preceding examples, and/or any other example disclosed herein, wherein the communication module is to obtain the object data and transmit the sensor data during a communications session, wherein the communications session is a voice over Internet Protocol (VoIP) session or a cellular network communications session.

Example 15 may include the apparatus of any of the preceding examples, and/or any other example disclosed herein, further comprises a device interface module to operate on the at least one processor to obtain, from the sensor, the sensor data representative of the first object, wherein the coordination module is to receive, from the device interface module, the sensor data representative of the first object.

Example 16 may include the apparatus of any of the preceding examples, and/or any other example disclosed herein, wherein to display the generated image, the rendering module is to output a first audio file, and to display the overlay image, the rendering module is to output a second audio file.

Example 17 may include the apparatus of any of the preceding examples, and/or any other example disclosed herein, further comprising the at least one processor, and a housing to contain the at least one processor, the one or more sensors, the communication module, the coordination module, the image generation module, and the rendering module.

Example 18 may include the apparatus of any of the preceding examples, and/or any other example disclosed herein, further comprising a base, a plurality of arms coupling the housing to the base. Example 18.5 may include the apparatus of any of the preceding examples, and/or any other example disclosed herein, wherein the plurality of arms may be moved into a desired position and/or orientation such that the FOV has a desired focus area.

Example 19 may include the apparatus of any of the preceding examples, and/or any other example disclosed herein, further comprising an arch coupled with the housing, with the housing disposed at an apex of the arch.

Example 20 may include the apparatus of any of the preceding examples, and/or any other example disclosed herein, further comprising a connector coupling the housing to a wall. Example 20.5 may include the apparatus of any of the preceding examples, and/or any other example disclosed herein, further comprising an rotating device disposed between the housing and the connector, wherein the rotating device is to allow the housing to move with respect to the connector such that an angle of the housing with respect to the wall may be altered without altering a position of the housing on the wall.

Example 21 may include at least one computer-readable medium including instructions to cause a computing device, in response to execution of the instructions by the computing device, to detect a first object in a field of view, FOV; obtain, from one or more sensors, sensor data representative of the first object; obtain object data representative of a second object detected by another computing device and a position of the second object; determine a position of the first object using the sensor data; generate an image of the second object based on the object data; generate an overlay image based on the first object or the second object; display the generated image at a position within the FOV based on the position of the second object; and display the overlay image within the FOV. The at least one computer readable medium may be a non-transitory computer readable medium.

Example 22 may include the at least one computer-readable medium of any of the preceding examples, and/or any other example disclosed herein, wherein the instructions cause the computing device, in response to execution of the instructions by the computing device, to generate the overlay image based on a distance between the first object and the second object.

Example 23 may include the at least one computer-readable medium of any of the preceding examples, and/or any other example disclosed herein, wherein the instructions cause the computing device, in response to execution of the instructions by the computing device, to generate the overlay image based on a position of the first object relative to a position of the second object.

Example 24 may include the at least one computer-readable medium of any of the preceding examples, and/or any other example disclosed herein, wherein the instructions cause the computing device, in response to execution of the instructions by the computing device, to determine, using the sensor data, whether a new object has been placed within the FOV, and instruct the one or more sensors to zoom in on the new object for a desired period of time.

Example 25 may include the at least one computer-readable medium of any of the preceding examples, and/or any other example disclosed herein, wherein the instructions cause the computing device, in response to execution of the instructions by the computing device, to instruct the one or more sensors to detect, during the desired period of time, at least one of information printed on the new object or a shape of the new object, determine an object type of the new object, and generate the overlay image based on the object type of the new object.

Example 26 may include the at least one computer-readable medium of any of the preceding examples, and/or any other example disclosed herein, wherein the instructions cause the computing device, in response to execution of the instructions by the computing device, to display the overlay image on top of the first object, on top of the second object, or in an unoccupied area of the FOV.

Example 27 may include the at least one computer-readable medium of any of the preceding examples, and/or any other example disclosed herein, wherein the instructions cause the computing device, in response to execution of the instructions by the computing device, to generate a counter, wherein the overlay image is an image indicative of a value of the counter; instruct the one or more sensors are to detect a gesture performed by a user of the computing device; obtain, from the one or more sensors, sensor data representative of the gesture; determine, using the sensor data representative of the gesture, a position of the gesture relative to a position of the overlay image; determine whether the gesture was performed proximate to the overlay image; and increment or decrement the counter when the gesture is determined to be performed proximate to the overlay image.

Example 28 may include the at least one computer-readable medium of any of the preceding examples, and/or any other example disclosed herein, wherein the instructions cause the computing device, in response to execution of the instructions by the computing device, to display the overlay image on top of the new object, when the counter value is representative of a virtual property value associated with the first object; and display the overlay image in an unoccupied area of the FOV, when the counter value is representative of a virtual property value associated with the user of the computing device.

Example 29 may include the at least one computer-readable medium of any of the preceding examples, and/or any other example disclosed herein, wherein the instructions cause the computing device, in response to execution of the instructions by the computing device, to determine an object type of the first object using the sensor data; instruct the one or more sensors to detect a gesture performed by a user of the computing device; obtain, from the one or more sensors, sensor data representative of the gesture; determine a position of the gesture relative to the first object using the sensor data that is representative of the gesture; determine whether the gesture was performed proximate to the first object; and display the overlay image over the first object when the gesture is determined to be performed proximate to the first object, wherein the overlay image displayed over the first objects is based on the object type of the first object.

Example 30 may include the at least one computer-readable medium of any of the preceding examples, and/or any other example disclosed herein, wherein the instructions cause the computing device, in response to execution of the instructions by the computing device, to determine an object type of the second object using the object data; determine whether the gesture was performed proximate to a position of the displayed image of the second object; and display the overlay image over the displayed image of the second object when the gesture is determined to be performed proximate to the position of the displayed image of the second object, wherein the overlay image displayed over the second object is based on the object type of the second object.

Example 31 may include the at least one computer-readable medium of any of the preceding examples, and/or any other example disclosed herein, wherein the instructions cause the computing device, in response to execution of the instructions by the computing device, to determine an object type of first object using the sensor data, determine an object type of the second object using the object data; determine, using the sensor data and the object data, whether a position of the first object is proximate to a position of the second object; display the overlay image over the first object or the second object when the position of the second object is determined to be proximate to the first object, wherein the overlay image to be displayed over the first object is based on the object type of the first object or the overlay image to be displayed over the one of the second objects is based on the object type of the second object.

Example 32 may include the at least one computer-readable medium of any of the preceding examples, and/or any other example disclosed herein, wherein the instructions cause the computing device, in response to execution of the instructions by the computing device, to determine a change in position of the first object; determine a change in position of the second object; display the overlay image over the first object when the change in position of the first object indicates that the first object was moved to be proximate to the second object; and display the overlay image over the second object when the change in position of the second object indicates that the second object was moved to be proximate to the first object.

Example 33 may include the at least one computer-readable medium of any of the preceding examples, and/or any other example disclosed herein, wherein the instructions cause the computing device, in response to execution of the instructions by the computing device, to transmit the sensor data to the other computing device, wherein the other computing device is to generate and display an image associated with each of the first object.

Example 34 may include the at least one computer-readable medium of any of the preceding examples, and/or any other example disclosed herein, wherein the instructions cause the computing device, in response to execution of the instructions by the computing device, to obtain the object data and transmit the sensor data during a communications session, wherein the communications session is a voice over Internet Protocol (VoIP) session or a cellular network communications session.

Example 35 may include the at least one computer-readable medium of any of the preceding examples, and/or any other example disclosed herein, wherein the instructions cause the computing device, in response to execution of the instructions by the computing device, to output a first audio file when the generate image is displayed, and output a second audio file when the overlay image is displayed Example 36 may include a system to provide an in-real-life (IRL) interactive experience. The system may comprise a remote play module, RPM, and a computing device. The RPM may comprise one or more sensors to detect a first object in a field of view, FOV, and generate sensor data representative of the first object; and a RPM communication module, communicatively coupled with at least one processor of the RPM, to couple with a computing device during a communications session. The computing device may comprise a computing device communication module, communicatively coupled with at least one processor of the computing device, to obtain object data representative of a second object detected by another apparatus and a position of the second object; a coordination module to operate on the at least one processor of the computing device to receive the sensor data and the object data, and determine a position of the first object using the sensor data; and an image generation module to operate on the at least one processor of the computing device, to generate an image of the second object based on the object data, generate an overlay image based on the first object or the second object, and provide the image of the second object and the overlay image to the computing device communication module, wherein the computing device communication module is to provide the image of the second object and the overlay image to the RPM communication module during the communication session. The RPM may further comprise a rendering module, communicatively coupled with the at least one processor of the RPM, to receive the image of the second object and the overlay image from the RPM communication module, display the generated image at a position within the FOV based on the position of the second object, and display the overlay image within the FOV.

Example 37 may include the system of any of the preceding examples, and/or any other example disclosed herein, wherein the image generation module is to generate the overlay image based on a distance between the position of the first object and the position of the second object.

Example 38 may include the system of the preceding examples, and/or any other example disclosed herein, wherein the coordination module is further to determine an orientation of the first object using the sensor data, the object data is further representative of an orientation of the second object, and the image generation module is to generate the overlay image based on the position and the orientation of the first object relative to the position and the orientation of the second object.

Example 39 may include the system of the preceding examples, and/or any other example disclosed herein, wherein the coordination module is to determine, using the sensor data, whether a new object has been placed within the FOV, and instruct the one or more sensors, via the computing device communication module, to zoom in on the new object for a desired period of time.

Example 40 may include the system of any of the preceding examples, and/or any other example disclosed herein, wherein during the desired period of time, the one or more sensors are to detect at least one of information printed on the new object or a shape of the new object, the coordination module is to determine an object type of the new object, and the image generation module is to generate the overlay image based on the object type of the new object.

Example 41 may include the system of the preceding examples, and/or any other example disclosed herein, wherein the overlay image is displayed on top of the first object, on top of the second object, or in an unoccupied area of the FOV.

Example 42 may include the system of the preceding examples, and/or any other example disclosed herein, wherein the coordination module is to generate a counter, and the overlay image is an image indicative of a value of the counter, the one or more sensors are to detect a gesture performed by a user of the RPM, and generate sensor data representative of the gesture, and the coordination module is further to receive the sensor data representative of the gesture, determine a position of the gesture relative to a position of the overlay image using the sensor data that is representative of the gesture, determine whether the gesture was performed proximate to the overlay image, and increment or decrement the counter when the gesture is determined to be performed proximate to the overlay image.

Example 43 may include the system of the preceding examples, and/or any other example disclosed herein, wherein the coordination module is to instruct the rendering module to display the overlay image on top of the new object, when the counter value is representative of a virtual property value associated with the first object, and the coordination module is to instruct the rendering module to display the overlay image in an unoccupied area of the FOV, when the counter value is representative of a virtual property value associated with the user of the RPM.

Example 44 may include the system of the preceding examples, and/or any other example disclosed herein, wherein the coordination module is to determine an object type of the first object using the sensor data, the one or more sensors are to detect a gesture performed by a user of the RPM, and generate sensor data representative of the gesture, and the coordination module is further to receive the sensor data representative of the gesture, determine a position of the gesture relative to the first object using the sensor data that is representative of the gesture, determine whether the gesture was performed proximate to the first object, and instruct the rendering module to display the overlay image over the first object when the gesture is determined to be performed proximate to the first object, wherein the overlay image to be displayed over the first objects is based on the object type of the first object.

Example 45 may include the system of any of the preceding examples, and/or any other example disclosed herein, wherein the coordination module is further to determine an object type of the second object using the object data, determine whether the gesture was performed proximate to a position of the displayed image of the second object, and instruct the rendering module to display the overlay image over the displayed image of the second object when the gesture is determined to be performed proximate to the position of the displayed image of the second object wherein the overlay image to be displayed over the second object is based on the object type of the second object.

Example 46 may include the system of any of the preceding examples, and/or any other example disclosed herein, wherein the coordination module is to determine an object type of first object using the sensor data, determine an object type of the second object using the object data, determine, using the sensor data and the object data, whether a position of the first object is proximate to a position of the second object, and instruct the rendering module to display the overlay image over the first object or the second object when the position of the second object is determined to be proximate to the first object wherein the overlay image to be displayed over the first object is based on the object type of the first object or the overlay image to be displayed over the one of the second objects is based on the object type of the second object.

Example 47 may include the system of any of the preceding examples, and/or any other example disclosed herein, wherein the coordination module is to determine a change in position of the first object, determine a change in position of the second object, instruct the rendering module to display the overlay image over the first object when the change in position of the first object indicates that the first object was moved to be proximate to the second object, and instruct the rendering module to display the overlay image over the second object when the change in position of the second object indicates that the second object was moved to be proximate to the first object.

Example 48 may include the system of any of the preceding examples, and/or any other example disclosed herein, wherein the RPM communication module or the computing device communication module is to transmit the sensor data to the other computing device, wherein the other apparatus is to generate and display an image associated with each of the first object.

Example 49 may include the system of any of the preceding examples, and/or any other example disclosed herein, wherein the RPM communication module is to obtain the object data and transmit the sensor data during a communications session, wherein the communications session is a voice over Internet Protocol (VoIP) session or a cellular network communications session.

Example 50 may include the system of any of the preceding examples, and/or any other example disclosed herein, wherein the RPM further comprises a device interface module to operate on the at least one processor of the RPM to obtain, from the one or more sensors, the sensor data representative of the first object, wherein the coordination module is to receive, from the device interface module, the sensor data representative of the first object.

Example 51 may include the system of any of the preceding examples, and/or any other example disclosed herein, wherein to display the generated image, the rendering module is to output a first audio file, and to display the overlay image, the rendering module is to output a second audio file.

Example 52 may include the system of any of the preceding examples, and/or any other example disclosed herein, wherein the RPM further comprises the at least one processor of the RPM, and a housing to contain the at least one processor of the RPM, the one or more sensors, the RPM communication module, and the rendering module.

Example 53 may include the system of any of the preceding examples, and/or any other example disclosed herein, further comprising a base, a plurality of arms coupling the housing to the base.

Example 54 may include the system of any of the preceding examples, and/or any other example disclosed herein, further comprising an arch coupled with the housing, and with the housing disposed at an apex of the arch.

Example 55 may include the system of the preceding examples, and/or any other example disclosed herein, further comprising a connector coupling the housing to a wall.

Example 56 may include the system of any of the preceding examples, and/or any other example disclosed herein, wherein the computing device further comprises a computing device rendering module, communicatively coupled with the at least one processor of the computing device, to receive the image of the second object and the overlay image from the computing device communication module, project the generated image at a position within the FOV based on the position of the second object or display the generated image within a display area of a display device of the computing device based on the position of the second object, and project the overlay image within the FOV or display the overlay image within the display area of the display device.

Example 57 may include the system of any of the preceding examples, and/or any other example disclosed herein, wherein the RPM includes a RPM image generation module to operate on the at least one processor of the RPM, to generate the image of the second object based on the object data, generate the overlay image based on the first object or the second object, and provide the image of the second object and the overlay image to the rendering module.

Example 58 may include the system of any of the preceding examples, and/or any other example disclosed herein, wherein the computing device does not include the image generation module when the RPM includes the RPM image generation module.

Example 59 may include a computer-implemented method for providing an in-real-life (IRL) interactive experience. The method may comprise detecting, by a computing device, a first object in a field of view, FOV; obtaining, by the computing device from one or more sensors, sensor data representative of the first object; obtaining, by the computing device, object data representative of a second object detected by another computing device and a position of the second object; determining, by the computing device, a position of the first object using the sensor data; generating, by the computing device, an image of the second object based on the object data; generating, by the computing device, an overlay image based on the first object or the second object; and providing, by the computing device, the IRL interactive experience. Providing the IRL interactive experience may comprise displaying the generated image at a position within the FOV based on the position of the second object; and displaying the overlay image within the FOV.

Example 60 may include the method of any of the preceding examples, and/or any other example disclosed herein, further comprising generating the overlay image based on a distance between the first object and the second object.

Example 61 may include the method of any of the preceding examples, and/or any other example disclosed herein, further comprising generating the overlay image based on a position of the first object relative to a position of the second object.

Example 62 may include the method of any of the preceding examples, and/or any other example disclosed herein, further comprising determining, using the sensor data, whether a new object has been placed within the FOV; and instructing the one or more sensors to zoom in on the new object for a desired period of time.

Example 63 may include the method of any of the preceding examples, and/or any other example disclosed herein, further comprising instructing the one or more sensors to detect, during the desired period of time, at least one of information printed on the new object or a shape of the new object; determining an object type of the new object; and generating the overlay image based on the object type of the new object.

Example 64 may include the method of any of the preceding examples, and/or any other example disclosed herein, further comprising displaying the overlay image on top of the first object, on top of the second object, or in an unoccupied area of the FOV.

Example 65 may include method of any of the preceding examples, and/or any other example disclosed herein, further comprising generating a counter, wherein the overlay image is an image indicative of a value of the counter; instructing the one or more sensors are to detect a gesture performed by a user of the computing device; obtaining, from the one or more sensors, sensor data representative of the gesture; determine, using the sensor data representative of the gesture, a position of the gesture relative to a position of the overlay image; determining whether the gesture was performed proximate to the overlay image; and incrementing or decrementing the counter when the gesture is determined to be performed proximate to the overlay image.

Example 66 may include the method of any of the preceding examples, and/or any other example disclosed herein, further comprising displaying the overlay image on top of the new object, when the counter value is representative of a virtual property value associated with the first object; and displaying the overlay image in an unoccupied area of the FOV, when the counter value is representative of a virtual property value associated with the user of the computing device.

Example 67 may include the method of any of the preceding examples, and/or any other example disclosed herein, further comprising determining an object type of the first object using the sensor data; instructing the one or more sensors to detect a gesture performed by a user of the computing device; obtaining, from the one or more sensors, sensor data representative of the gesture; determining a position of the gesture relative to the first object using the sensor data that is representative of the gesture; determining whether the gesture was performed proximate to the first object; and displaying the overlay image over the first object when the gesture is determined to be performed proximate to the first object, wherein the overlay image displayed over the first objects is based on the object type of the first object.

Example 68 may include method of any of the preceding examples, and/or any other example disclosed herein, further comprising determining an object type of the second object using the object data; determining whether the gesture was performed proximate to a position of the displayed image of the second object; displaying the overlay image over the displayed image of the second object when the gesture is determined to be performed proximate to the position of the displayed image of the second object, wherein the overlay image displayed over the second object is based on the object type of the second object.

Example 69 may include the method of any of the preceding examples, and/or any other example disclosed herein, further comprising determining an object type of first object using the sensor data, determine an object type of the second object using the object data; determining, using the sensor data and the object data, whether a position of the first object is proximate to a position of the second object; displaying the overlay image over the first object or the second object when the position of the second object is determined to be proximate to the first object, wherein the overlay image to be displayed over the first object is based on the object type of the first object or the overlay image to be displayed over the one of the second objects is based on the object type of the second object.

Example 70 may include the method of any of the preceding examples, and/or any other example disclosed herein, further comprising determining a change in position of the first object; determining a change in position of the second object; displaying the overlay image over the first object when the change in position of the first object indicates that the first object was moved to be proximate to the second object; and displaying the overlay image over the second object when the change in position of the second object indicates that the second object was moved to be proximate to the first object.

Example 71 may include the method of any of the preceding examples, and/or any other example disclosed herein, further comprising transmitting the sensor data to the other computing device, wherein the other computing device is to generate and display an image associated with each of the first object.

Example 72 may include the method of any of the preceding examples, and/or any other example disclosed herein, further comprising establishing a communications session the obtaining the object data and transmitting the sensor data occurs during a communications session, wherein the communications session is a voice over Internet Protocol (VoIP) session or a cellular network communications session.

Example 73 may include the method of any of the preceding examples, and/or any other example disclosed herein, wherein providing the IRL interactive experience further comprises outputting a first audio file when the generate image is displayed; and outputting a second audio file when the overlay image is displayed.

Example 74 may include at least one computer-readable medium including instructions to cause the computing device or a remote play module (RPM), in response to execution of the instructions by the computing device or the RPM, to perform the method of any of the preceding examples, and/or any other example disclosed herein. The at least one computer-readable medium may be a non-transitory computer-readable medium.

Example 75 may include an apparatus to provide an in-real-life (IRL) interactive experience. The apparatus may comprise a first means to detect a first object in a field of view, FOV, and generate first means data representative of the first object; a second means to obtain object data representative of a second object detected by another apparatus and a position of the second object; a third means to receive the first means data and the object data, and determine a position of the first object using the first means data; a fourth means to generate an image of the second object based on the object data, and generate an overlay image based on the first object or the second object; and a fifth means to display the generated image at a position within the FOV based on the position of the second object, and display the overlay image within the FOV.

Example 76 may include the apparatus of any of the preceding examples, and/or any other example disclosed herein, wherein the fourth means is to generate the overlay image based on a distance between the position of the first object and the position of the second object.

Example 77 may include the apparatus of any of the preceding examples, and/or any other example disclosed herein, wherein the third means is further to determine an orientation of the first object using the first means data, the object data is further representative of an orientation of the second object, and the fourth means is to generate the overlay image based on the position and the orientation of the first object relative to the position and the orientation of the second object.

Example 78 may include the apparatus of any of the preceding examples, and/or any other example disclosed herein, wherein the third means is to determine, using the first means data, whether a new object has been placed within the FOV, and instruct the first means to zoom in on the new object for a desired period of time.

Example 79 may include the apparatus of any of the preceding examples, and/or any other example disclosed herein, wherein during the desired period of time, the first means are to detect at least one of information printed on the new object or a shape of the new object, the third means is to determine an object type of the new object, and the fourth means is to generate the overlay image based on the object type of the new object.

Example 80 may include the apparatus of any of the preceding examples, and/or any other example disclosed herein, wherein the overlay image is displayed on top of the first object, on top of the second object, or in an unoccupied area of the FOV.

Example 81 may include the apparatus of any of the preceding examples, and/or any other example disclosed herein, wherein the third means is to generate a counter, and the overlay image is an image indicative of a value of the counter, the first means are to detect a gesture performed by a user of the apparatus, and generate first means data representative of the gesture, and the third means is further to receive the first means data representative of the gesture, determine a position of the gesture relative to a position of the overlay image using the first means data that is representative of the gesture, determine whether the gesture was performed proximate to the overlay image, and increment or decrement the counter when the gesture is determined to be performed proximate to the overlay image.

Example 82 may include the apparatus of any of the preceding examples, and/or any other example disclosed herein, wherein the third means is to instruct the fifth means to display the overlay image on top of the new object, when the counter value is representative of a virtual property value associated with the first object, and the third means is to instruct the fifth means to display the overlay image in an unoccupied area of the FOV, when the counter value is representative of a virtual property value associated with the user of the apparatus.

Example 83 may include the apparatus of any of the preceding examples, and/or any other example disclosed herein, wherein the third means is to determine an object type of the first object using the first means data, the first means are to detect a gesture performed by a user of the apparatus, and generate first means data representative of the gesture, and the third means is further to receive the first means data representative of the gesture, determine a position of the gesture relative to the first object using the first means data that is representative of the gesture, determine whether the gesture was performed proximate to the first object, and instruct the fifth means to display the overlay image over the first object when the gesture is determined to be performed proximate to the first object, wherein the overlay image to be displayed over the first objects is based on the object type of the first object.

Example 84 may include the apparatus of any of the preceding examples, and/or any other example disclosed herein, wherein the third means is further to determine an object type of the second object using the object data, determine whether the gesture was performed proximate to a position of the displayed image of the second object, and instruct the fifth means to display the overlay image over the displayed image of the second object when the gesture is determined to be performed proximate to the position of the displayed image of the second object wherein the overlay image to be displayed over the second object is based on the object type of the second object.

Example 85 may include the apparatus of any of the preceding examples, and/or any other example disclosed herein, wherein the third means is to determine an object type of first object using the first means data, determine an object type of the second object using the object data, determine, using the first means data and the object data, whether a position of the first object is proximate to a position of the second object, and instruct the fifth means to display the overlay image over the first object or the second object when the position of the second object is determined to be proximate to the first object wherein the overlay image to be displayed over the first object is based on the object type of the first object or the overlay image to be displayed over the one of the second objects is based on the object type of the second object.

Example 86 may include the apparatus of any of the preceding examples, and/or any other example disclosed herein, wherein the third means is to determine a change in position of the first object, determine a change in position of the second object, instruct the fifth means to display the overlay image over the first object when the change in position of the first object indicates that the first object was moved to be proximate to the second object, and instruct the fifth means to display the overlay image over the second object when the change in position of the second object indicates that the second object was moved to be proximate to the first object.

Example 87 may include the apparatus of any of the preceding examples, and/or any other example disclosed herein, wherein the second means is to transmit the first means data to the other apparatus, wherein the other apparatus is to generate and display an image associated with each of the first object.

Example 88 may include the apparatus of any of the preceding examples, and/or any other example disclosed herein, wherein the second means is to obtain the object data and transmit the first means data during a communications session, wherein the communications session is a voice over Internet Protocol (VoIP) session or a cellular network communications session.

Example 89 may include the apparatus of any of the preceding examples, and/or any other example disclosed herein, further comprising a sixth means to obtain, from the first means, the first means data representative of the first object, wherein the third means is to receive, from the sixth means, the first means data representative of the first object.

Example 90 may include the apparatus of any of the preceding examples, and/or any other example disclosed herein, wherein to display the generated image, the fifth means is to output a first audio file, and to display the overlay image, the fifth means is to output a second audio file.

Example 91 may include the apparatus of any of the preceding examples, and/or any other example disclosed herein, further comprising a sixth means to contain the first means, the second means, the third means, the fourth means, and the fifth means.

Example 92 may include the apparatus of any of the preceding examples, and/or any other example disclosed herein, further comprising a seventh means, a plurality of eighth means coupling the sixth means to the seventh means, wherein the plurality of eighth means are to be moved into a desired position and orientation such that the FOV has a desired focus area.

Example 93 may include the apparatus of any of the preceding examples, and/or any other example disclosed herein, further comprising a seventh means coupled with the sixth means, and with the sixth means disposed at an apex of the seventh means.

Example 94 may include the apparatus of any of the preceding examples, and/or any other example disclosed herein, further comprising a seventh means to couple the sixth means to a structure.

Example 95 may include the apparatus of any of the preceding examples, and/or any other example disclosed herein, further comprising an eighth means disposed between the seventh means and the sixth means, wherein the eighth means is to allow the sixth means to move with respect to the seventh means such that an angle of the sixth means with respect to the structure may be altered without altering a position of the sixth means on the structure.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

We claim:

1. An apparatus for computing, the apparatus comprising:
   one or more processors, at least one memory device, communication circuitry, and one or more sensors, communicatively coupled with one another, wherein:
   the one or more sensors to detect a first object in a field of view (FOV) and generate sensor data representative of the first object;
   communication circuitry is to obtain object data representative of a second object detected by another apparatus and a position of the second object;
   the at least one memory device is to store coordination logic, image generation logic, and rendering logic; and
   the one or more processors are to:
   operate the coordination logic to:
      receive the sensor data and the object data,
      determine a position of the first object using the sensor data,
      determine an object type of the first object using the sensor data,
      determine an object type of the second object using the object data, and
      determine, using the sensor data and the object data, whether a position of the first object is proximate to a position of the second object;
   operate the image generation logic to generate an image of the second object based on the object data, and generate an overlay image based on a position of the first object relative to the second object; and
   operate the rendering logic to:
      display the generated image of the second object at a position within the FOV based on the position of the second object,
      display the generated overlay image over or near the first object or over or near the second object when the position of the second object is determined to be proximate to the first object, wherein the overlay image to be displayed over or near the first object is based on the object type of the first object or the overlay image to be displayed over or near the second object is based on the object type of the second object.

2. The apparatus of claim 1, wherein the one or more processors are to operate the coordination logic to determine, using the sensor data, whether a new object has been placed within the FOV, and instruct the one or more sensors to zoom in on the new object for a desired period of time.

3. The apparatus of claim 2, wherein during the desired period of time, the one or more sensors are to detect at least one of information printed on the new object or a shape of the new object, the coordination logic is to determine an object type of the new object, and the image generation logic is to generate the overlay image based on the object type of the new object.

4. The apparatus of claim 2, wherein the overlay image is displayed on top of the first object, on top of the second object, or in an unoccupied area of the FOV.

5. The apparatus of claim 4, wherein:
the one or more processors are to operate the coordination logic to generate a counter, and the overlay image is an image indicative of a value of the counter,
the one or more sensors are to detect a gesture performed by a user of the apparatus, and generate sensor data representative of the gesture, and
the one or more processors are to operate the coordination logic to receive the sensor data representative of the gesture, determine a position of the gesture relative to a position of the overlay image using the sensor data that is representative of the gesture, determine whether the gesture was performed proximate to the overlay image, and increment or decrement the counter when the gesture is determined to be performed proximate to the overlay image.

6. The apparatus of claim 5, wherein the one or more processors are to operate:
the coordination logic to instruct the rendering logic to display the overlay image on top of the new object, when the counter value is representative of a virtual property value associated with the first object, and
the coordination logic to instruct the rendering logic to display the overlay image in an unoccupied area of the FOV, when the counter value is representative of a virtual property value associated with the user of the apparatus.

7. The apparatus of claim 4, wherein:
the one or more processors are to operate the coordination logic to determine an object type of the first object using the sensor data,
the one or more sensors are to detect a gesture performed by a user of the apparatus, and generate sensor data representative of the gesture, and
the one or more processors are to operate the coordination logic to:
receive the sensor data representative of the gesture,
determine a position of the gesture relative to the first object using the sensor data that is representative of the gesture,
determine whether the gesture was performed proximate to the first object, and
instruct the rendering logic to display the overlay image over the first object when the gesture is determined to be performed proximate to the first object, wherein the overlay image to be displayed over the first object is based on the object type of the first object.

8. The apparatus of claim 7, wherein the one or more processors are to operate the coordination logic to:
determine an object type of the second object using the object data, determine whether the gesture was performed proximate to a position of the displayed image of the second object, and
instruct the rendering logic to display the overlay image over the displayed image of the second object when the gesture is determined to be performed proximate to the position of the displayed image of the second object wherein the overlay image to be displayed over the second object is based on the object type of the second object.

9. The apparatus of claim 1, wherein the one or more processors are to operate the coordination logic to:
determine a change in position of the first object, determine a change in position of the second object,
instruct the rendering logic to display the overlay image over the first object when the change in position of the first object indicates that the first object was moved to be proximate to the second object, and
instruct the rendering logic to display the overlay image over the second object when the change in position of the second object indicates that the second object was moved to be proximate to the first object.

10. The apparatus of claim 1, wherein the communication circuitry is to transmit the sensor data to the other apparatus, wherein the other apparatus is to generate and display an image associated with the first object.

11. The apparatus of claim 10, wherein the communication circuitry is to obtain the object data and transmit the sensor data during a communications session, wherein the communications session is a voice over Internet Protocol (VoIP) session or a cellular network communications session.

12. The apparatus of claim 1, further comprising:
device interface circuitry to obtain, from the one or more sensors, the sensor data representative of the first object, wherein the coordination logic is to receive, from the device interface circuitry, the sensor data representative of the first object.

13. The apparatus of claim 12, further comprising the one or more processors, and a housing to contain the at least one memory device, the one or more processors, the one or more sensors, the communication circuitry, and the device interface circuitry.

14. The apparatus of claim 13, further comprising a base, a plurality of arms coupling the housing to the base.

15. The apparatus of claim 13, further comprising an arch coupled with the housing, and with the housing disposed at an apex of the arch.

16. The apparatus of claim 13, further comprising a connector coupling the housing to a wall.

17. The apparatus of claim 1, wherein to display the generated image, the one or more processors are to operate the rendering logic to output a first audio file, and to display the overlay image, the rendering logic is to output a second audio file.

18. The apparatus of claim 1, wherein the one or more processors are to operate the image generation logic to generate the overlay image based on features of the first object or the second object, wherein the features comprise: an object type of the first object or the second object, a size of the first object or the second object, a shape of the first object or the second object, a color or colors of the first object or the second object, an object type of the first object or the second object, or content printed on the first object or the second object.

19. At least one non-transitory computer-readable medium including instructions to cause a computing device, in response to execution of the instructions by the computing device, to:
detect a first object in a field of view (FOV);
obtain, from one or more sensors, sensor data representative of the first object;

obtain object data representative of a second object detected by another computing device and a position of the second object;

determine a position of the first object using the sensor data;

determine an object type of the first object using the sensor data;

determine an object type of the second object using the object data;

determine, using the sensor data and the object data, whether a position of the first object is proximate to a position of the second object;

generate an image of the second object based on the object data;

generate an overlay image based on a position of the first object relative to the second object;

display the generated image at a position within the FOV based on the position of the second object; and display the overlay image within the FOV over or near the first object or over or near the second object when the position of the second object is determined to be proximate to the first object, wherein the overlay image to be displayed over or near the first object is based on the object type of the first object or the overlay image to be displayed over or near the second object is based on the object type of the second object.

20. The at least one non-transitory computer-readable medium of claim 19, wherein the instructions cause the computing device, in response to execution of the instructions by the computing device, to determine, using the sensor data, whether a new object has been placed within the FOV, and instruct the one or more sensors to zoom in on the new object for a desired period of time.

21. The at least one non-transitory computer-readable medium of claim 20, wherein the instructions cause the computing device, in response to execution of the instructions by the computing device, to instruct the one or more sensors to detect, during the desired period of time, at least one of information printed on the new object or a shape of the new object, determine an object type of the new object, and generate the overlay image based on the object type of the new object.

22. The at least one non-transitory computer-readable medium of claim 19, wherein the instructions cause the computing device, in response to execution of the instructions by the computing device, to display the overlay image on top of the first object, on top of the second object, or in an unoccupied area of the FOV.

23. The at least one non-transitory computer-readable medium of claim 22, wherein the instructions cause the computing device, in response to execution of the instructions by the computing device, to:

generate a counter, wherein the overlay image is an image indicative of a value of the counter;

instruct the one or more sensors to detect a gesture performed by a user of the computing device;

obtain, from the one or more sensors, sensor data representative of the gesture;

determine, using the sensor data representative of the gesture, a position of the gesture relative to a position of the overlay image;

determine whether the gesture was performed proximate to the overlay image; and increment or decrement the counter when the gesture is determined to be performed proximate to the overlay image.

24. The at least one non-transitory computer-readable medium of claim 19, wherein the instructions cause the computing device, in response to execution of the instructions by the computing device, to:

determine a change in position of the first object;

determine a change in position of the second object;

display the overlay image over the first object when the change in position of the first object indicates that the first object was moved to be proximate to the second object; and display the overlay image over the second object when the change in position of the second object indicates that the second object was moved to be proximate to the first object.

25. The at least one non-transitory computer-readable medium of claim 19, wherein the instructions cause the computing device, in response to execution of the instructions by the computing device, to:

generate the overlay image further based on features of the first object or the second object, wherein the features comprise: an object type of the first object or the second object, a size of the first object or the second object, a shape of the first object or the second object, a color or colors of the first object or the second object, an object type of the first object or the second object, or content printed on the first object or the second object.

* * * * *